United States Patent
Barnhouse et al.

[11] Patent Number: 6,098,094
[45] Date of Patent: Aug. 1, 2000

[54] METHOD AND SYSTEM FOR AN INTELLIGENT DISTRIBUTED NETWORK ARCHITECTURE

[75] Inventors: Robert Barnhouse; Doug Cardy, both of Plano; Kelvin Porter, Dallas; Ken Rambo; Carol Waller, both of Allen; Wendy Wong, Dallas; George Yao, Plano, all of Tex.

[73] Assignee: MCI WorldCom, Inc, Clinton, Miss.

[21] Appl. No.: 09/428,703

[22] Filed: Oct. 27, 1999

Related U.S. Application Data

[62] Division of application No. 09/128,937, Aug. 5, 1998.
[60] Provisional application No. 60/061,173, Oct. 6, 1997.

[51] Int. Cl.[7] ............................................. G06F 13/00
[52] U.S. Cl. ............................................................ 709/203
[58] Field of Search ............................ 709/1, 100, 303, 709/304, 305, 203, 217, 218, 219

[56] References Cited

U.S. PATENT DOCUMENTS

| | | | |
|---|---|---|---|
| 5,157,390 | 10/1992 | Yoshie et al. | 340/825.52 |
| 5,475,817 | 12/1995 | Waldo et al. | 395/650 |
| 5,551,035 | 8/1996 | Arnold et al. | 395/650 |
| 5,664,102 | 9/1997 | Faynberg | 395/200.76 |
| 5,826,268 | 10/1998 | Shaefer et al. | 707/9 |
| 5,838,970 | 11/1998 | Thomas | 395/683 |
| 5,940,616 | 8/1999 | Wang | 395/704 |

*Primary Examiner*—Moustafa M. Meky

[57] ABSTRACT

The present invention provides an intelligent call processor, an intelligent switching node and an intelligent communications network for use in a communications system. The intelligent call processor comprises a logical platform having a plurality of functions wherein at least one of the functions is service processing function, at least one of the functions is call processing, and at least one of the functions is facility processing, and a processor for executing the plurality of functions. The intelligent switching node comprises an intelligent call processor and, a resource complex communicably linked to the intelligent call processor and logically separated from the intelligent call processor. The intelligent communications network comprises a plurality of intelligent distributed network nodes, a network management system for monitoring and controlling a wide area network and the plurality of intelligent switching nodes, and the wide area network interconnecting the plurality of intelligent distributed network nodes and the network management system.

3 Claims, 17 Drawing Sheets

MOCE Use Flow

METHOD AND SYSTEM FOR AN INTELLIGENT DISTRIBUTED NETWORK ARCHITECTURE

CROSS-REFERENCE TO RELATED APPLICATION

This application is a divisional of U.S. patent application Ser. No. 09/128,937, filed on Aug. 5, 1998, still pending.

This Application claims the benefit of U.S. Provisional Application Serial No. 60/061,173, filed Oct. 6, 1997.

FIELD OF THE INVENTION

The present invention related generally to network switching in a Telecommunications system and more particularly to a method and system for an intelligent distributed network architecture for service processing

BACKGROUND OF THE INVENTION

A network service is a function performed by a communications network, such as data or telephony, and its associated resources in response to an interaction with one or more subscribers. For example, a telephony network resident service, such as call forwarding or voice mail access, can be invoked by a subscriber by dialing a special sequence of digits. Other network services may be directed at assisting a network owner with security, validation, and authentication. Adding or modifying a service requires changes to be made in the communications network.

Most conventional telecommunication networks are composed of interconnected switches and communication devices. These switches are controlled by integrated or imbedded processors operated by proprietary software or firmware designed by the switch manufacturer. Typically, the switch manufacturer's software or firmware must support all functional aspects of service processing, call processing, facility processing and network management. This means that when a network owner wishes to implement a new service or modify an existing service, the software of every switch in the network must be revised by the various switch manufacturers.

The fact that the network contains different switch models from different manufacturers requires careful development, testing and deployment of the new software. The time required to develop, test and deploy the new software is lengthened because the code size at each switch grows larger and more complex with each new revision. Thus, this process can take several years. In addition, this increased complexity further burdens the switch processors, increases the chances for switch malfunction, and may require the modification or replacement of the switch.

Moreover, the fact that multiple network owners depend upon a common set of switch manufacturers results in two undesirable situations that limit competition. First, a manufacturer's software release may attempt to incorporate changes requested by several network owners, thus preventing the network owners from truly differentiating their services from the services provided by their competition. This also forces some network owners to wait until the manufacturer incorporates requests from other network owners into the new release. Second, a switch software release incorporating a function as requested by one network owner to implement a new service can unintentionally become accessible to other network owners.

These problems have become intolerable as the demand for new network services has increased exponentially over the last five to ten years due to increased subscriber mobility, increased variety and bandwidth of traffic, dissolution of traditional numbering plans, more sophisticated services and increased competition. Thus, it is widely recognized that new network architectures need to incorporate a more flexible way of creating, deploying and executing service logic. In order to fully appreciate the novel architecture of the present invention hereinafter described, the following description of the relevant prior art is provided with reference to FIGS. 1–4.

Referring to FIG. 1, a logical representation of various switching architectures, including the present invention, is shown. A monolithic switch, which is denoted generally as 20, contains service processing functions 22, call processing functions 24, facility processing functions 26 and a switch fabric 28. All of these functions 22, 24, 26 and 28 are hard-coded, intermixed and undifferentiated, as symbolized by the group 30. Moreover, functions 22, 24, 26 and 28 are designed by the switch manufacturer and operate on proprietary platforms that vary from manufacturer to manufacturer. As a result, these functions 22, 24, 26 and 28 cannot be modified without the aid of the manufacturer, which slows down service development and implementation, and increases the cost of bringing a new service to market. The development of new and innovative services, call processing, data processing, signal processing and network operations are, therefore, constrained by the manufacturer's control over their proprietary switch hardware and software, and the inherent difficulty of establishing and implementing industry standards.

The service processing functions 22 are encoded within the monolithic switch 20 and only allow local control of this process based on local data contents and the number dialed. This local information is interpreted by a hand-coded process engine that carries out the encoded service function. The call processing functions 24 are hard-coded and provide call origination and call termination functions. This process actually brings up and takes down individual connections to complete a call. Likewise, the facility processing functions 26 are also hard-coded and provide all data processing relating to the physical resources involved in a call. The switch fabric 28 represents the hardware component of the switch and the computer to run the monolithic software provided by the switch manufacturer, such as Northern Telecom, Inc. The switch fabric 28 provides the physical facilities necessary to establish a connection and may include, but is not limited to, bearer devices (T1's and DS0's), switching matrix devices (network planes and their processors), link layer signal processors (SS7, MTP, ISDN, LAPD) and specialized circuits (conference ports, audio tone detectors).

In an attempt to address the previously described problems, the International Telecommunications Union and the European Telecommunication Standards Institute endorsed the ITU-T Intelligent Network Standard ("IN"). Similarly, Bellcore endorsed the Advanced Intelligent Network Standard ("AIN"). Although these two standards differ in presentation and evolutionary state, they have almost identical objectives and basic concepts. Accordingly, these standards are viewed as a single network architecture in which the service processing functions 22 are separated from the switch.

Using the IN and AIN architectures, a network owner could presumably roll out a new service by creating and deploying a new Service Logic Program ("SLP"), which is essentially a table of Service Independent Building Blocks ("SIBB") to be invoked during a given type of call. According to this approach, a number of specific element types inter-operate in conjunction with a SLP to provide services to network subscribers. As a result, any new or potential services are limited by the existing SIBBs.

The IN or AIN architecture, which is denoted generally as 40, logically separates the functions of the monolithic switch 20 into a Service Control Point ("SCP") 42, and a Service Switching Point ("SSP") and Switching System 44. The SCP 42 contains the service processing functions 22, whereas the SSP and Switching System 44 contain the call processing functions 24, facility processing functions 26 and the switch fabric 28. In this case, the call processing functions 24, facility processing functions 26 and the switch fabric 28 are hard-coded, intermixed and undifferentiated, as symbolized by the group 46.

The Service Switching Point ("SSP") is a functional module that resides at a switch in order to recognize when a subscriber's signaling requires more than simple routing based solely upon the number dialed. The SSP suspends further handling of the call while it initiates a query for correct handling of the call to the remote SCP 42, which essentially acts as a database server for a number of switches. This division of processing results in the offloading of the infrequent, yet time consuming task of handling special service calls, from the switch. Furthermore, this moderate centralization draws a balance between having one readily modifiable, heavy burdened repository serving the whole network versus deploying a complete copy of the repository at every switch.

Referring now to FIG. 2, a diagram of a telecommunications system employing an IN or AIN architecture is shown and is denoted generally as 50. Various customer systems, such as an ISDN terminal 52, a first telephone 54, and a second telephone 56 are connected to the SSP and Switching System 44. The ISDN terminal 52 is connected to the SSP and Switching System 44 by signaling line 60 and transport line 62. The first telephone 54 is connected to the SSP and Switching System 44 by transport line 64. The second telephone 56 is connected to a remote switching system 66 by transport line 68 and the remote switching system 66 is connected to the SSP and Switching System 44 by transport line 70.

As previously described in reference to FIG. 1, the SSP 70 is a functional module that resides at a switch in order to recognize when a subscriber's signaling requires more than simple routing based upon the number dialed. The SSP 70 suspends further handling of the call while it initiates a query for correct handling of the call. This query is sent in the form of SS7 messaging to a remote SCP 42. The Service Control Point 42 is so named because changing the database content at this location can alter the network function as it appears to subscribers connected through the many subtending switches. The query is sent through signaling line 72 to the Signal Transfer Point ("STP") 74, which is simply a router for SS7 messaging among these elements, and then through signaling line 76 to the SCP 42.

The Integrated Service Management System ("ISMS") 78 is envisioned as a management tool to deploy or alter services or to manage per-subscriber access to services. The ISMS 78 operates mainly by altering the operating logic and data stored within the SSP 70 and SCP 42. The ISMS 78 has various user interfaces 80 and 82. This ISMS 78 is connected to the SCP 42 by operations line 84, the SSP and Switching System 44 by operations line 86, and the Intelligent Peripheral ("IP") 88 by operations line 90. The Intelligent Peripheral 88 is a device used to add functions to the network that are not available on the switches, such as a voice response or speech recognition system. The IP 88 is connected to the SSP and Switching System 44 by signaling line 92 and transport line 94.

Now referring to FIGS. 2 and 3, the processing of a call in accordance with the prior art will be described. The call is initiated when the customer picks up the receiver and begins dialing in block 100. The SSP 70 at the company switch monitors the dialing and recognizes the trigger sequence in block 102. The SSP 70 suspends further handling of the call until service logic can be consulted in block 104. The SSP 70 then composes a standard SS7 message and sends it though STP(s) 74 to the SCP 42 in block 104. The SCP 42 receives and decodes the message and invokes the SLP in block 106. The SLI interprets the SLP, which may call for actuating other functions such as database lookup for number translation, in block 106. The SCP 42 returns a SS7 message to the SSP and Switching System 44 regarding the handling of the call or otherwise dispatches messages to the network elements to carry out the correct service in block 108. At the conclusion of the call, a SS7 message is sent among the switches to tear down the call and call detail records are created by each switch involved in the call in block 110. The call detail records are collected, correlated, and resolved offline for each call to derive billing for toll calls in block 112. Call processing is completed in block 114.

The IN and AIN architectures attempt to predefine a standard set of functions to support all foreseeable services. These standard functions are all hard-coded into various state machines in the switch. Unfortunately, any new functions, which are likely to arise in conjunction with new technologies or unforeseen service needs, cannot be implemented without an extensive overhaul and testing of the network software across many vendor platforms. Furthermore, if a new function requires changes to standardized call models, protocols, or interfaces, the implementation of the service utilizing that function may be delayed until the changes are ratified by an industry standards group. But even as draft standards have attempted to broaden the set of IN and AIN supported functions, equipment suppliers have refused to endorse these draft standards due to the staggering increase in code complexity.

Referring now to FIG. 4, the process for generic service creation according to the prior art will be described. The network owner requests a new function involving a new service, new call state and new protocol in block 120. If a new call model is requested at decision block 122, a proposal must be submitted to the standards body and the network owner must wait for industry adoption of the new standard, which can take from one to three years, in block 124. After the new standard is adopted or if a new call model is not requested, as determined in decision block 122, the network owner must request and wait for code updates from each manufacturer to implement the new function, which can take from six to eighteen months, in block 126.

The network owner must test the new function and all previous functions for each manufacturer, which can take from one to three months, in block 128. If all the tests are not successful, as determined in decision block 130, and the cause of the failure is a design problem, as determined in decision block 132, the process must be restarted at block 122. If, however, the cause of the failure is a code problem, as determined in decision block 132, the manufacturer must fix the code in block 134 and the testing must be redone in block 128.

If all the tests are successful, as determined in decision block 130, and the manufacturer creates the service, as determined in decision block 136, the network owner must request a new service version from the manufacturer and wait for delivery of the tested version in block 138. If, however, the network owner creates the service, as determined in decision block 136, the network owner must create a new version of the service using a creation tool and iterate through unit testing to ensure that the new service works correctly in block 140. In either case, the network owner then performs an integration test to ensure that all previous services still operate properly in block 142. A system test must then be run to ensure proper coordination between the SCP and the switch in block 144. The network owner must then coordinate simultaneous loading of the new software release to all switches and SCP's in the network in block 146. The implementation of the new function is completed in block 148.

Referring now back to FIG. 2, other limitations of the IN and AIN architecture arise from having the call processing and facility processing functions, namely the SSP 70, operating within the switch. As a result, these functions must be provided by each switch manufacturer using their proprietary software. Network owners are, therefore, still heavily dependant upon manufacturer software releases to support new functions. To further complicate the matter, the network owner cannot test SSP 70 modules in conjunction with other modules in a unified development and test environment. Moreover, there is no assurance that an SSP 70 intended for a switch manufacturer's processing environment will be compatible with the network owner's service creation environment.

This dependancy of multiple network owners upon a common set of switch manufacturers results in two undesirable situations that limit competition. First, a manufacturer's software release may attempt to incorporate changes requested by several network owners, thus preventing the network owners from truly differentiating their services from the services provided by their competition. This also forces some network owners to wait until the manufacturer incorporates requests from other network owners into the new release. Second, a switch software release incorporating a function as requested by one network owner to implement a new service can unintentionally become accessible to other network owners. Therefore, despite the intentions of the IN and AIN architects, the network owner's creation, testing and deployment of new services is still impeded because the network owner does not have complete control of, or access to, the functional elements that shape network service behavior.

In another attempt to solve these problems, as disclosed in pending U.S. patent application Ser. No. 08/580,712, now U.S. Pat. No. 6,041,109, a Separate Switch Intelligence and Switch Fabric ("SSI/SF") architecture, which is referred to generally as 150 (FIG. 1), logically separates the SSP 70 from the Switching System 44. Now referring back to FIG. 1, the switch intelligence 152 contains the call processing functions 24 and facility processing functions 26 that are encoded in discrete state tables with corresponding hard-coded state machine engines, which is symbolized by circles 154 and 156. The interface between the switch fabric functions 158 and switch intelligence functions 152 may be extended through a communications network such that the switch fabric 158 and switch intelligence 152 may not necessarily be physically located together, be executed within the same processor, or even have a one-to-one correspondence. In turn, the switch intelligence 152 provides a consistent interface of simple non-service-specific, non-manufacturer-specific functions common to all switches.

An Intelligent Computing Complex ("ICC") 160, contains the service processing functions 22 and communicates with multiple switch intelligence elements 152. This approach offers the network owner advantages in flexible service implementation because all but the most elementary functions are moved outside the realm of the manufacturer-specific code. Further improvements may be realized by providing a more unified environment for the creation, development, test and execution of service logic.

As previously discussed, current network switches are based upon monolithic proprietary hardware and software. Although network switches can cost millions of dollars, such equipment is relatively slow in terms of processing speed when viewed in light of currently available computing technology. For example, these switches are based on Reduced-Instruction Set Computing ("RISC") processors running in the range of 60 MHz and communicate with each other using a data communications protocol, such as X.25, that typically supports a transmission rate of 9.6 Kb/s between various platforms in a switching network. This is extremely slow when compared to personal computers that contain processors running at 200 MHz or above and high end computer workstations that offer 150 Mb/s FDDI and ATM interfaces. Accordingly, network owners need to be able to use high-end workstations instead of proprietary hardware.

SUMMARY OF THE INVENTION

The present invention may include an intelligent call processor, an intelligent switching node and an intelligent communications network for use in a communications system. The intelligent call processor may include a logical platform having a plurality of functions wherein at least one of the functions is service processing function, at least one of the functions is call processing, and at least one of the functions is facility processing, and a processor for executing the plurality of functions. The intelligent switching node may include an intelligent call processor and, a resource complex communicably linked to the intelligent call processor and logically separated from the intelligent call processor. The intelligent communications network may include a plurality of intelligent distributed network nodes, a network management system for monitoring and controlling a wide area network and the plurality of intelligent switching nodes, and the wide area network interconnecting the plurality of intelligent distributed network nodes and the network management system.

BRIEF DESCRIPTION OF THE DRAWINGS

The above and further advantages of the present invention may be better understood by referring to the following description in conjunction with the accompanying drawings, in which.

DETAILED DESCRIPTION

Figure 1:
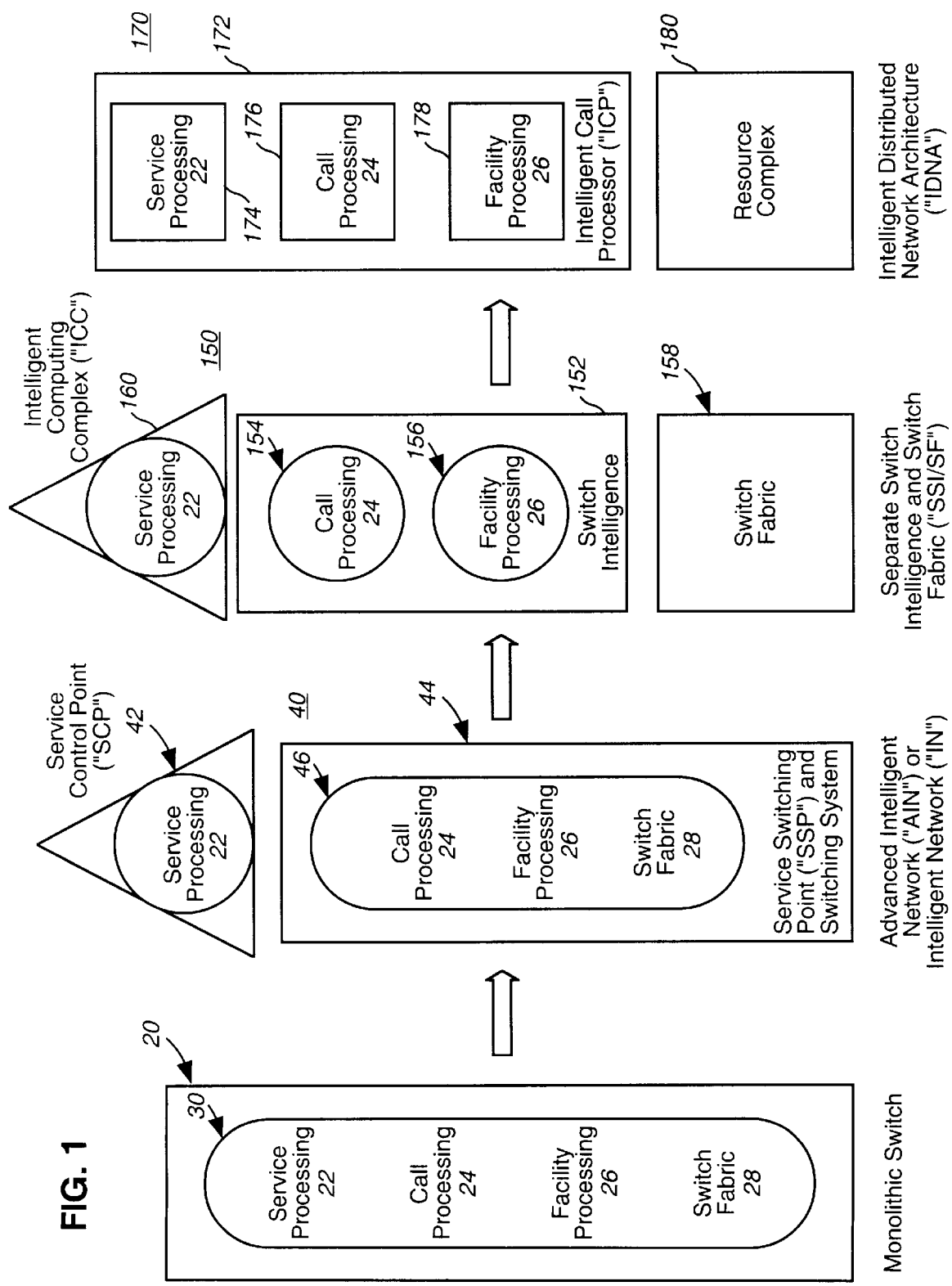
FIG. 1 is logical representation of various switching architectures, including the present invention.
Figure 2:
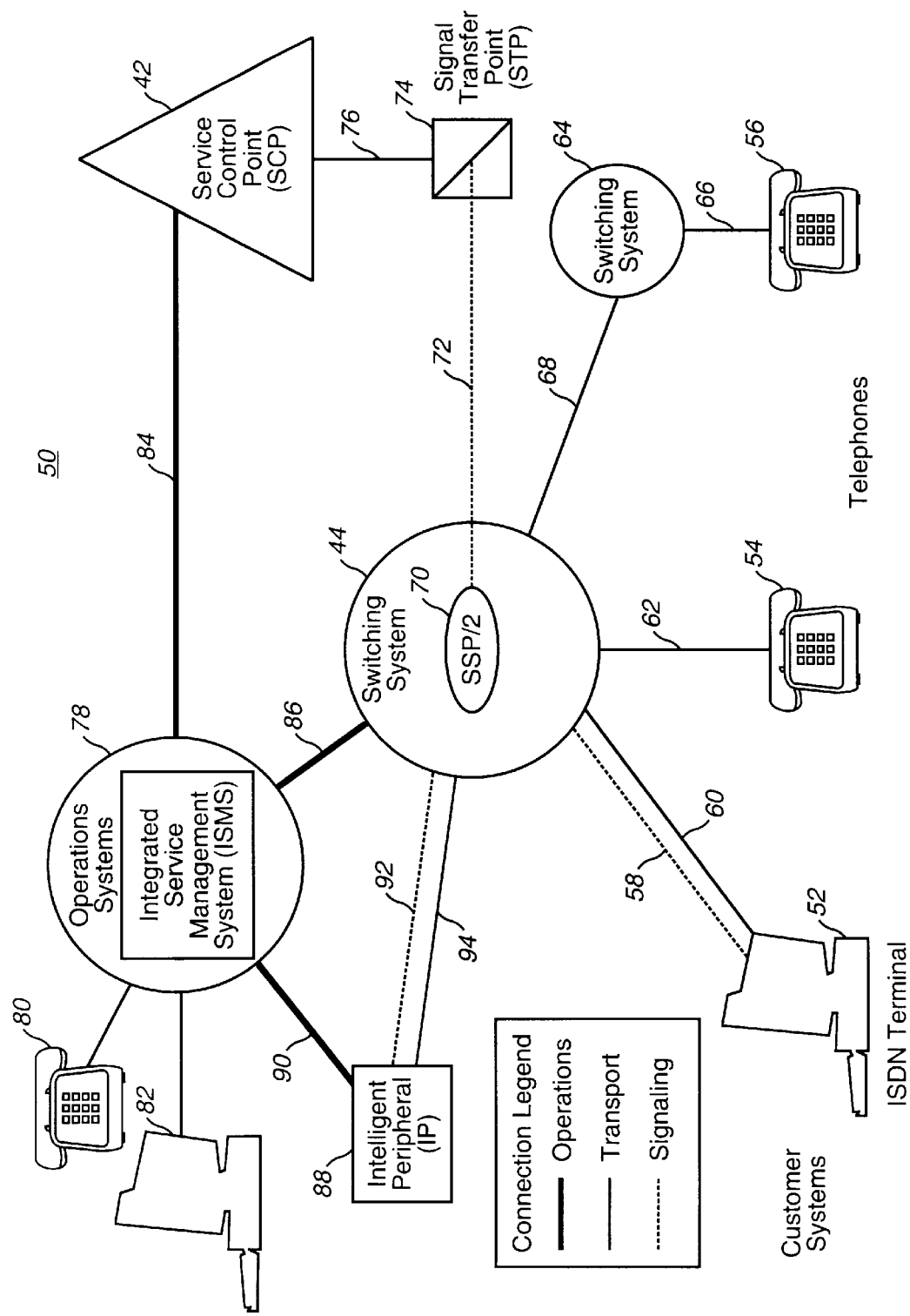
FIG. 2 is a diagram of a telecommunications system employing a typical intelligent network configuration according to the prior art.
Figure 3:
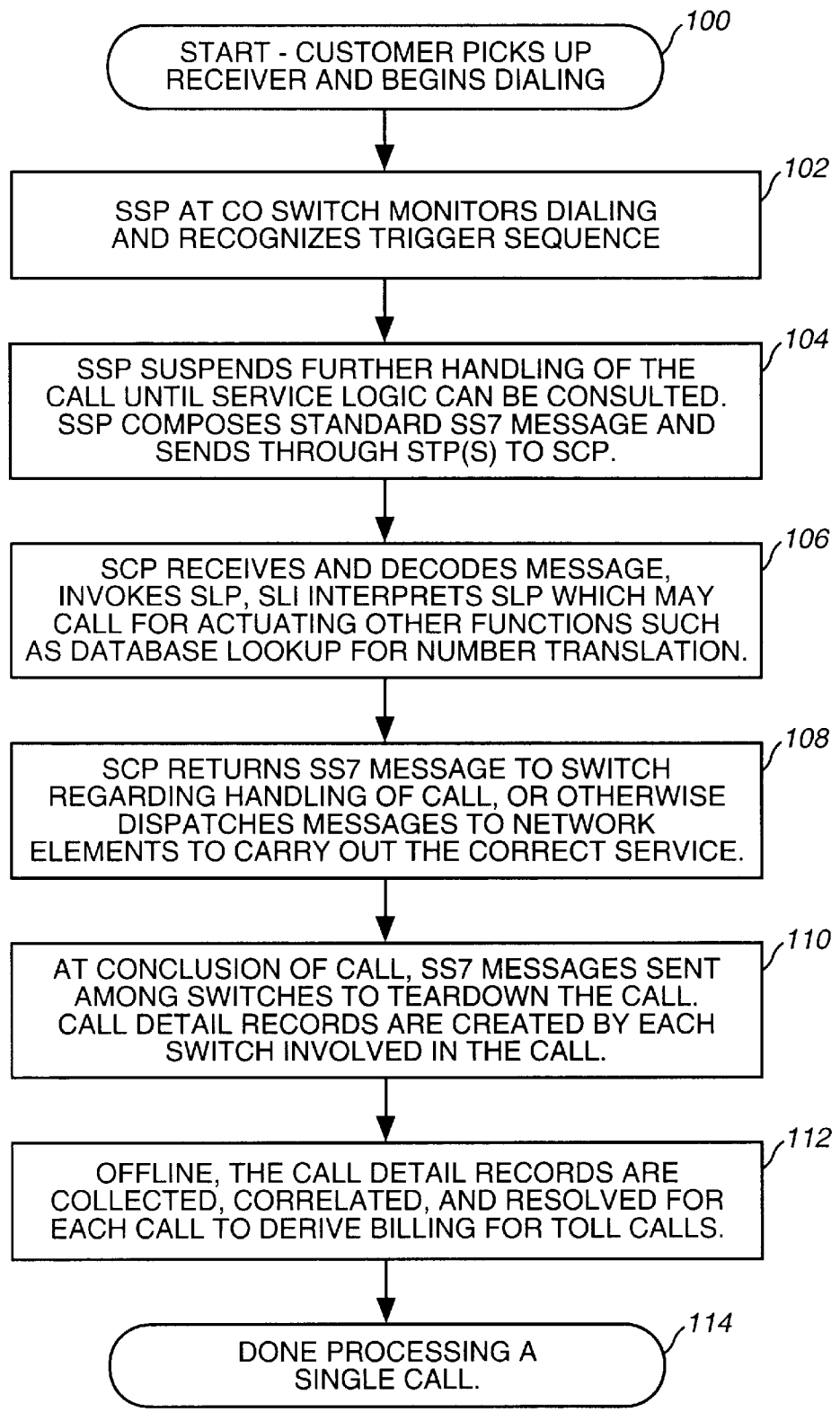
FIG. 3 is a flowchart for generic call processing according to the prior art.
Figure 4:
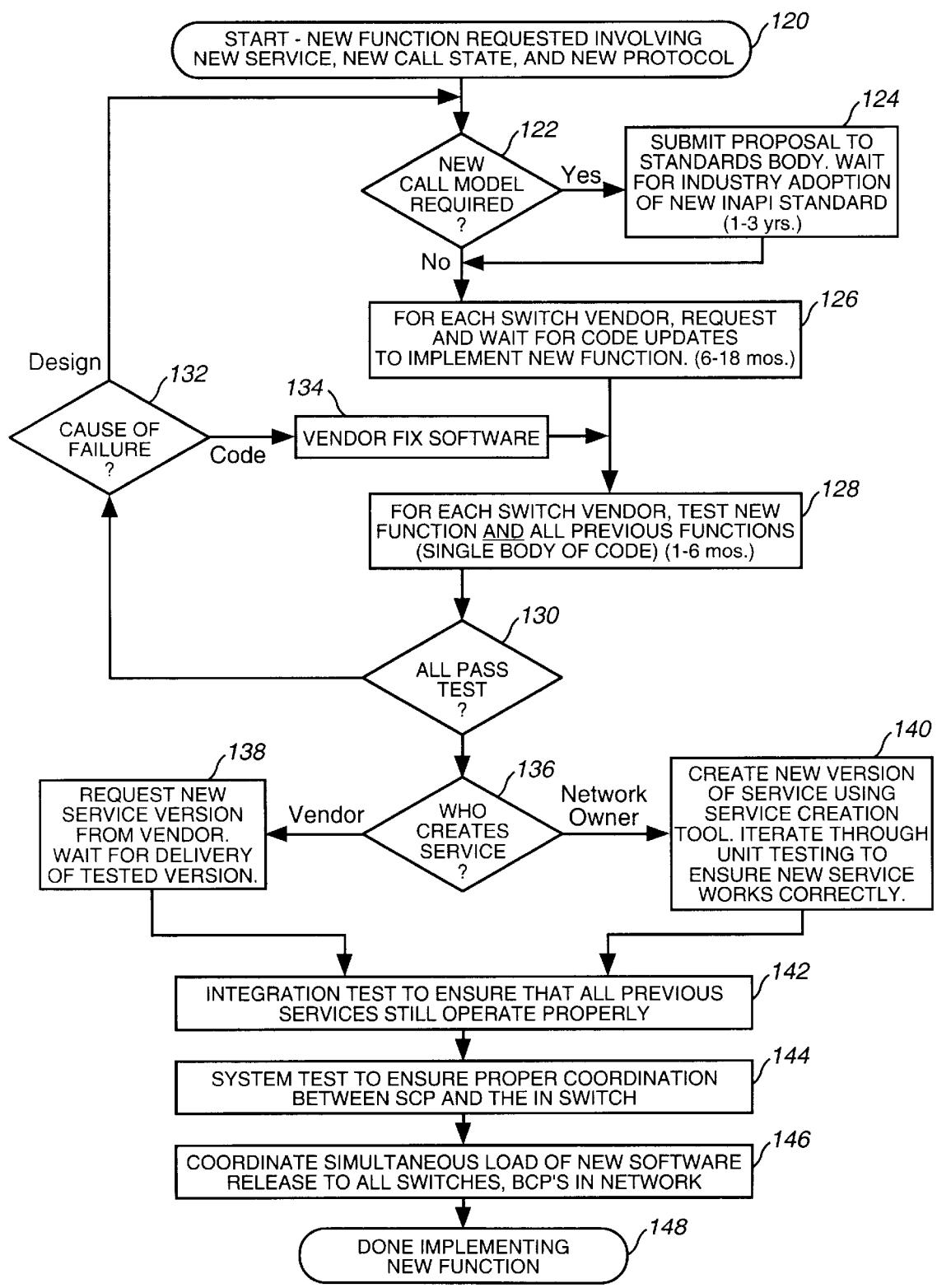
FIG. 4 is a flowchart for generic service creation according to the prior art.

Now referring to FIG. 1, an Intelligent Distributed Network Architecture ("IDNA") according to the present invention is denoted generally as 170. The present invention unifies the ICC 160 and Switch Intelligence 152 of the SSI/SF architecture 150 into an Intelligent Call Processor ("ICP") 172. Unlike the IN or AIN or SSI/SF architectures 40, whose functions are defined in state tables, the ICP 172 contains the service control functions 22, call processing functions 24 and facility processing functions 26 as managed objects in an object-oriented platform, which is symbolized by blocks 174, 176 and 178. The ICP 172 is logically separated from the Resource Complex 180.

Figure 5:
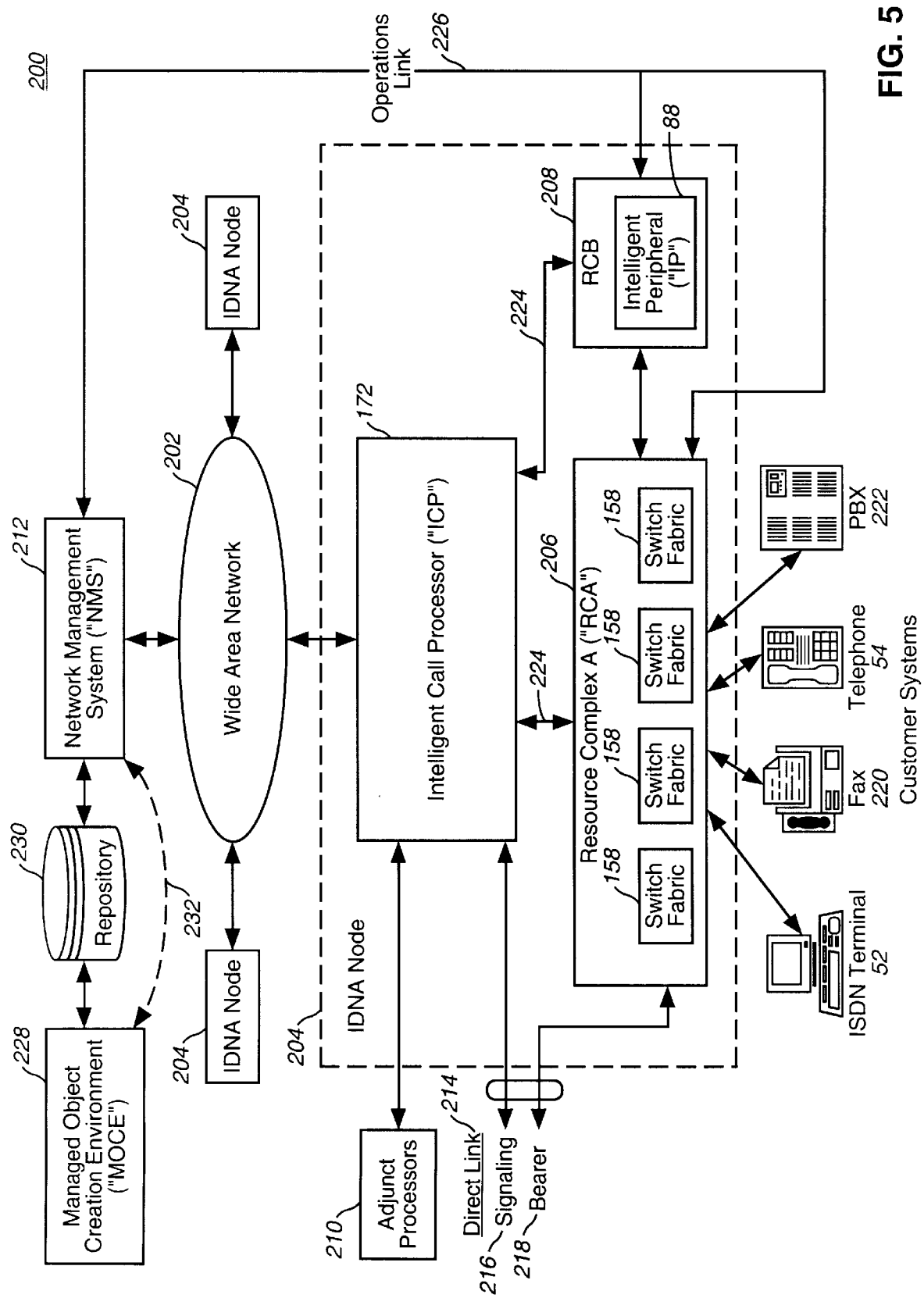
FIG. 5 is a diagram of a telecommunications system employing a intelligent distributed network architecture in accordance with the present invention.

Now referring to FIG. 5, a telecommunications system employing a intelligent distributed network architecture in accordance with the present invention will be described and is denoted generally as 200. The Wide Area Network ("WAN") 202 is a system that supports the distribution of applications and data across a wide geographic area. The transport network is based upon Synchronous Optical NETwork ("SONET") and connects the IDNA Nodes 204 and enables the applications within those nodes to communicate with each other.

Each IDNA Node 204 contains an Intelligent Call Processor ("ICP") 172 and a Resource Complex 180 (FIG. 1). FIG. 5 illustrates an IDNA Node 204 having a Resource Complex A ("RCA") 206 and a Resource Complex B ("RCB") 208. The ICP 172 can be linked to Adjunct Processors 210, which provide existing support functions, such as provisioning, billing and restoration. Eventually the functions provided by the Adjunct Processors 210 could be absorbed by functions within the Network Management System ("NMS") 212. The ICP 172 can be also be linked to other ICP's 172, other networks (not shown), or other devices (not shown) through a direct link 214 having signaling 216 and bearer links 218. A direct link prevents latency between the connected devices and allows the devices to communicate in their own language. The ICP 172 is the "brain" of the IDNA Node 204 and is preferably a general purpose computer, which may range from a single processor with a single memory storage device to a large scale computer network depending on the processing requirements of the IDNA Node 204. Preferably, the general purpose computer will have redundant processing, memory storage and connections.

As used herein, general purpose computers refer to computers that are, or may be assembled with, commercial off-the-shelf components, as opposed to dedicated devices specifically configured and designed for telephone switching applications. The integration of general purpose computers within the calling network affords numerous advantages.

The use of general purpose computers gives the ICP 172 the capability of scaling up with additional hardware to meet increased processing needs. These additions include the ability to increase processing power, data storage, and communications bandwidth. These additions do not require the modification of manufacturer-specific software and/or hardware on each switch in the calling network. Consequently, new services and protocols may be implemented and installed on a global scale, without modification of individual devices in the switching network. By changing from monolithic switches 20 (FIG. 1) to intelligent call processors 172, the present invention provides the foregoing advantages and increased capabilities.

In the case of applications that require more processing power, multi-processing allows the use of less expensive processors to optimize the price/performance ratio for call processing. In other applications, it may be advantageous, necessary or more cost effective to use more powerful machines, such as minicomputers, with higher processing rates.

The ICP 172 may, as noted above, comprise a cluster of general purpose computers operating, for example, on a UNIX or Windows NT operating system. For example, in a large application, supporting up to 100,000 ports on a single Resource Complex, the ICP 172 may consist of sixteen (16) 32 bit processors operating at 333 MHZ in a Symmetric Multi-Processor cluster. The processors could, for example, be divided into four separate servers with four processors each. The individual processors would be connected with a System Area Network ("SAN") or other clustering technology. The processor cluster could share access to Redundant Array of Independent Disks ("RAID") modular data storage devices. Shared storage may be adjusted by adding or removing the modular disk storage devices. The servers in the clusters would preferably share redundant links to the RC 180 (FIG. 1).

As illustrated and like the "plug and play" feature of personal computers, the ICP software architecture is an open processing model that allows the interchangeability of (1) management software, (2) ICP applications, (3) computing hardware and software, (4) resource complex components, and even (5) service architecture and processing. Such a generic architecture reduces maintenance costs due to standardization and provides the benefits derived from economies of scale.

Thus, the present invention enables the partitioning of development work and the use of modular tools that result in faster development and implementation of services. Moreover, the use of and the relevant aspects of service management are within the control of the network operator on an as required basis as opposed to the constraints imposed by fixed messaging protocol or a particular combination of hardware and software supplied by a given manufacturer.

Through the use of managed objects, the present invention also allows services and functions to be flexibly ("where you want it") and dynamically ("on the fly") distributed across the network based on any number of factors, such as capacity and usage. Performance is improved because service processing 22 (FIG. 1), call processing 24 (FIG. 1) and facility processing 26 (FIG. 1) operate in a homogeneous platform. In addition, the present invention allows the monitoring and manipulation of call sub-elements that could not be accessed before. The present invention also allows the network operator to monitor the usage of functions or services so that when they are outdated or unused they can be eliminated.

The Resource Complex ("RC") 180 (FIG. 1) is a collection of physical devices, or resources, that provide bearer, signaling and connection services. The RC 180, which can include Intelligent Peripherals 88, replaces the switch fabric 28 and 158 (FIG. 1) of the IN or AIN or SSI/SF architecture. Unlike the IN or AIN architecture, the control of the Resource Complex, such as RCA 206 is at a lower level. Moreover, the RCA 206 can contain more than one switch fabric 158. The switch fabrics 158 or other customer interfaces (not shown) connect to multiple subscribers and switching networks via standard telephony connections. These customer systems may include ISDN terminals 52, fax machines 220, telephones 54, and PBX systems 222. The ICP 172 controls and communicates with the RC 180 (FIG. 1), RCA 206 and RCB 208 through a high speed data communications pipe (minimally 100 Mb/sec Ethernet connection) 224. The RC 180, 206 and 208 can be analogized to a printer and ICP 172 can be analogized to a personal computer wherein the personal computer uses a driver to control the printer. The "driver" in the IDNA Node 204 is a Resource Complex Proxy ("RCP") (not shown), which will be described below in reference to FIG. 6. This allows manufacturers to provide an IDNA compliant node using this interface without having to rewrite all of their software to incorporate IDNA models.

In addition, the control of the Resource Complex 180 (FIG. 1), RCA 206 and RCB 208, is at a lower level than typically provided by the AIN or IN architecture. As a result, resource complex manufacturers only have to provide a single interface to support facility and network management processing; they do not have to provide the network owner with specific call and service processing. A low level interface is abstracted into more discrete operations. Having a single interface allows the network owner to choose from a wide spectrum of Resource Complex manufacturers, basing decisions on price and performance. Intelligence is added to the ICP 172 rather than the RC 180, which isolates the RC 180 from changes and reduces its complexity. Since the role of the RC 180 is simplified, changes are more easily made, thus making it easier to migrate to alternative switching and transmission technologies, such as Asynchronous Transfer Mode ("ATM").

Intelligent Peripherals ("IP") 88 provide the ability to process and act on information contained within the actual call transmission path. IP's 88 are generally in a separate Resource Complex, such as RCB 208, and are controlled by the ICP's 172 in a similar manner as RCA 206. IP's 88 can provide the ability to process data in the actual call transmission path in real-time using Digital Signal Processing ("DSP") technology.

The Network Management System ("NMS") 212 is used to monitor and control hardware and services in the IDNA Network 200. A suggested NMS 212 implementation might be a Telecommunications Management Network ("TMN") compliant framework which provides management of the components within the IDNA Network 200. More specifically, the NMS 212 controls the deployment of services, maintains the health of those services, provides information about those services, and provides a network-level management function for the IDNA Network 200. The NMS 212 accesses and controls the services and hardware through agent functionality within the INDA nodes 204. The ICP-NMS Agent (not shown) within the IDNA Node 204 carries out the commands or requests issued by the NMS 212. The NMS 212 can directly monitor and control RCA 206 and RCB 208 through a standard operations link 226.

The Managed Object Creation Environment ("MOCE") 228 contains the sub-components to create services that run in the IDNA Network 200. A Service Independent Building Block ("SIBB") and API representations that a service designer uses to create new services are imbedded within the MOCE's primary sub-component, a Graphical User Interface ("GUI"). The MOCE 228 is a unified collection of tools hosted on a single user environment or platform. It represents the collection of operations that are required throughout the process of service creation, such as service documentation, managed object definition, interface definition, protocol definition and data input definition, which are encapsulated in managed objects, and service testing. The network owner only has to develop a service once using the MOCE 228, because managed objects can be applied to all the nodes on his network. This is in contrast to the network owner having each of the various switch manufacturers develop their version of the service, which means that the service must be developed multiple times.

The MOCE 228 and NMS 212 are connected together via a Repository 230. The Repository 230 contains the managed objects that are distributed by the NMS 212 and used in the IDNA Nodes 204. The Repository 230 also provides a buffer between the MOCE 228 and the NMS 212. The MOCE 228 may, however, be directly connected to the NMS 212 to perform "live" network testing, which is indicated by the dashed line 232.

Figure 6:
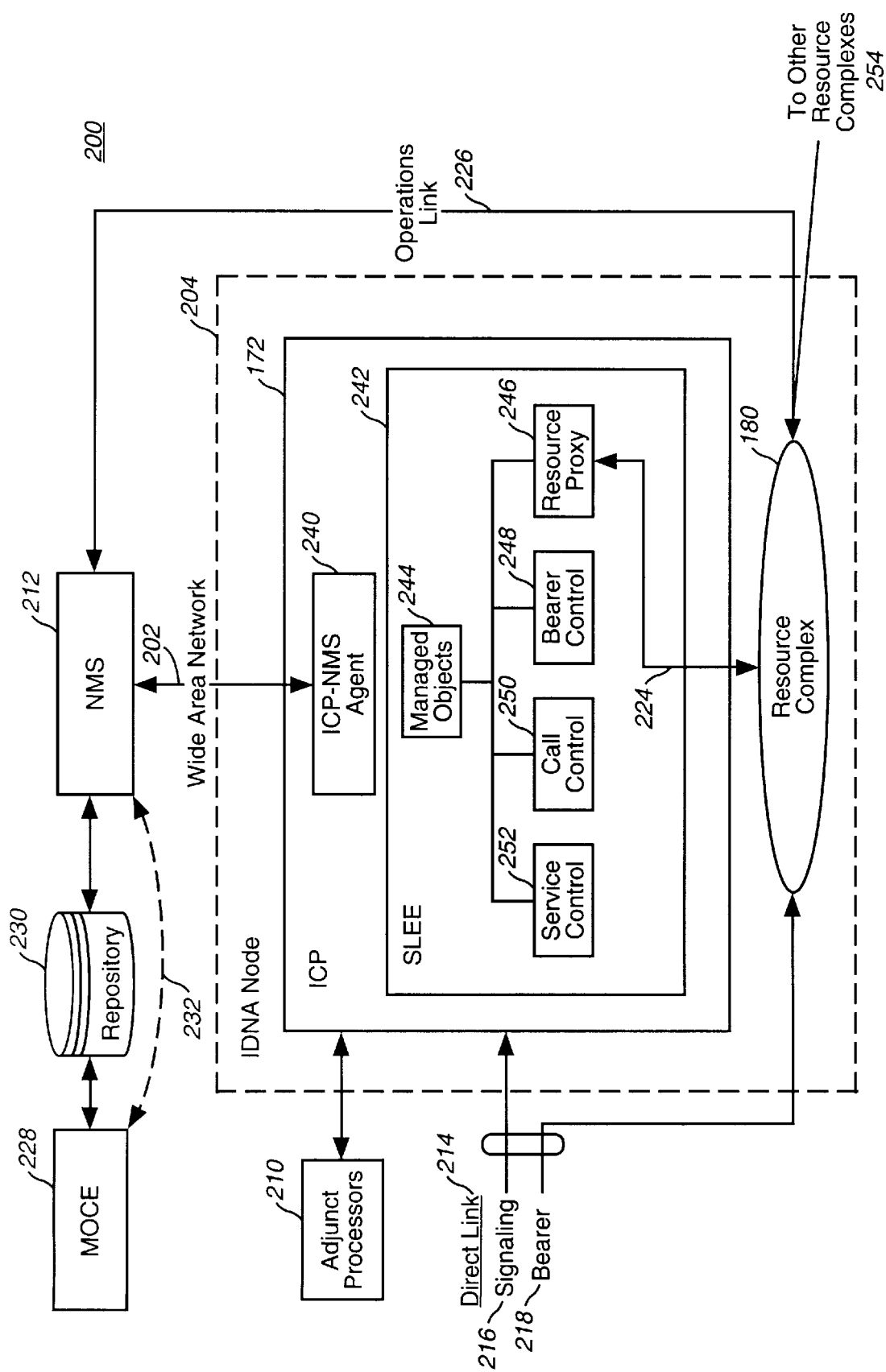
FIG. 6 is a logical and functional diagram of a telecommunications system employing a intelligent distributed network architecture in accordance with the present invention.

Referring now to FIG. 6, a logical and functional diagram of a telecommunications system employing a intelligent distributed network architecture 200 in accordance with the present invention will be described. The ICP 172 is shown to contain a ICP-NMS Agent 240 and a Service Layer Execution Environment ("SLEE") 242 that in turn hosts a variety of managed objects 246, 248, 250 and 252 derived from the managed objects base class 244.

In general, managed objects are a method of packaging software functions wherein each managed object offers both functional and management interfaces to implement the functions of the managed object. The management interface controls access to who and what can access the managed object functions. In the present invention, all of the telephony application software, except for the infrastructure software, run by the IDNA Node 204 is deployed as managed objects and supporting libraries. This provides a uniform interface and implementation to control and manage the IDNA Node software.

The collection of network elements that connect, route, and terminate bearer traffic handled by the node will be collectively referred to as the Resource Complex ("RC") 180. The service processing applications running on the SLEE use the Resource Proxy ("RCP") 244 as a control interface to the RC 180. The RCP 244 may be likened to a device driver in that it adapts equipment-independent commands from objects in the SLEE to equipment-specific commands to be performed by the RC 180. The RCP 244 can be described as an interface implementing the basic commands common among vendors of the resources in the RCP 244. The RCP 244 could be implemented as shown as one or more managed objects running on the IDNA node 204. Alternatively, this function could be provided as part of the RC 180. The NMS 212, Repository 230 and MOCE 228 are consistent with the description of those elements in the discussion of FIG. 5.

Note that the operations link 226 directly connects the NMS 212 to the RC 180. This corresponds to the more traditional role of a network management system in monitoring the operational status of the network hardware. This can be done independently of the IDNA architecture (e.g., by using the well-known TMN approach). In addition, the RC 180 may be connected to other resource complexes 254. A direct signaling link 214 is also shown entering the ICP 172 so that signaling 216, such as SS7, can enter the call processing environment directly. By intercepting signaling at the network periphery, the SS7 message can go directly to the ICP 172 without going through the RC 180. This reduces latency and improves robustness by shortening the signaling path. An accompanying bearer link 218 connects to the RC 180.

Figure 7:
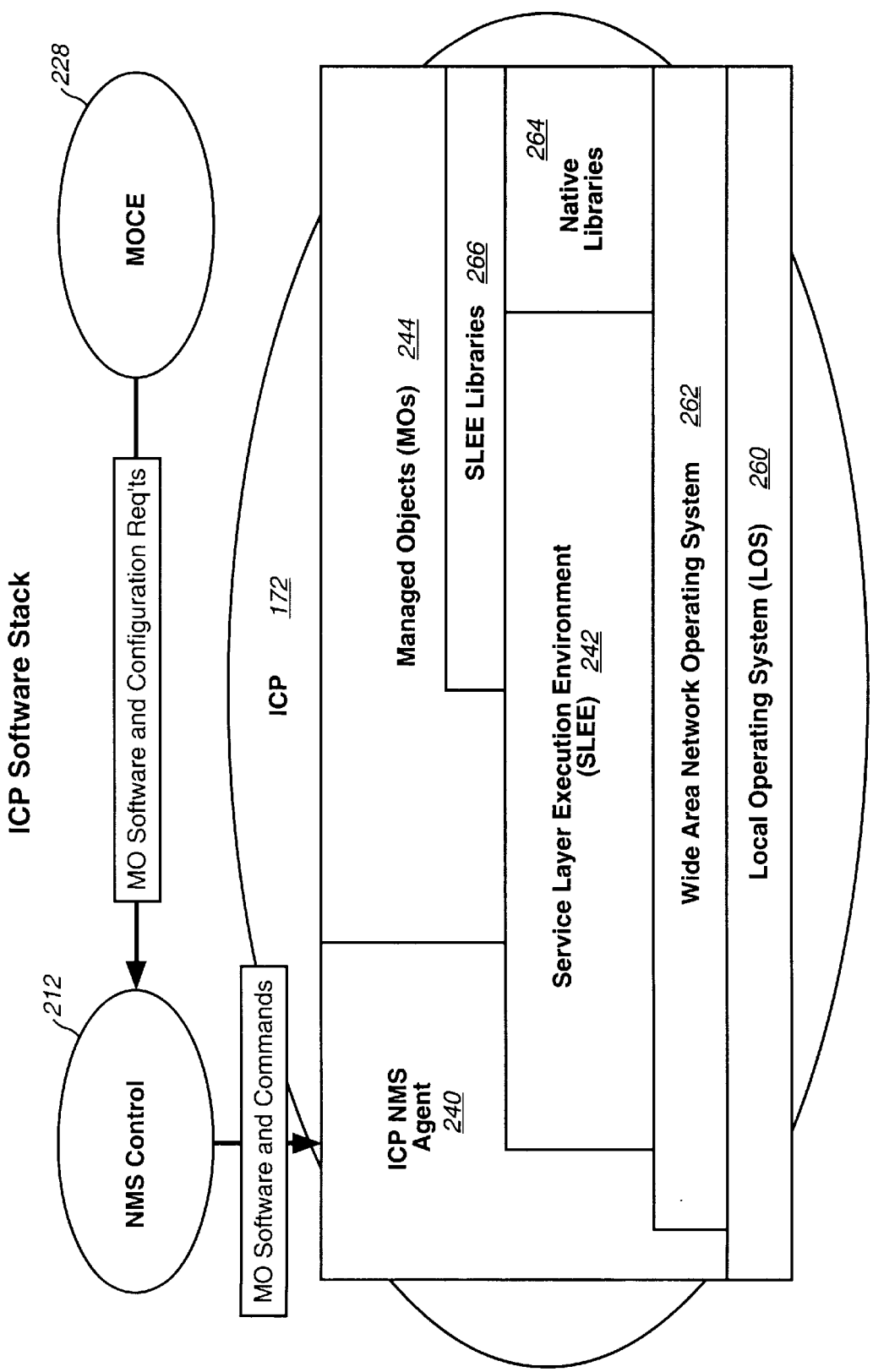
FIG. 7 is a diagram illustrating the layering of functional interfaces within an intelligent call processor in accordance with the present invention.

FIG. 7 depicts the layering of functional interfaces within the ICP 172. The MOCE 228 is the system where the managed object software and its dependancies are generated. The NMS 212 controls the execution of the ICP 172 by interfacing to an agent function provided within the ICP 172, called the ICP-NMS Agent 240. The NMS 212 controls the operation of the Local Operating System ("LOS") 260 on the ICP 172. The NMS 212 controls the operation of the ICP 172, including starting and stopping of processes, querying the contents of the process table, and the status of processes, configuring the operating system parameters, and monitoring the performance of the general purpose computer system that hosts the ICP 172.

The NMS 212 also controls the operation of the Wide Area Network Operating System ("WANOS") 262. The NMS 212 controls the initialization and operation of the WANOS support processes and the configuration of the WANOS libraries via its control of the LOS 260 and any other interfaces provided by the NMS SLEE control. The NMS 212 controls the instantiation and operation of the one or more SLEE's 242 running on an ICP 172. The LOS 260 is a commercial-off-the-self operating system for operation the general purpose computer. The WANOS 262 is a commercial-off-the-shelf middle-ware software package (e.g., an object request broker) that facilitates seamless communication between computing nodes. The SLEE 242 hosts the execution of managed objects 244, which are software instances that implement the service processing architecture. The SLEE 242 implements the means to control the execution of the managed objects 244 by the ICP-NMS Agent 240. Thus, a SLEE 242 instance is a software process capable of deploying and removing managed object software, instantiating and destroying managed object instances, supporting the interaction and collaboration of managed objects, administering access to Native Libraries 264, and interfacing with the NMS-ICP Agent 240 in implementing the required controls.

The Native Libraries 264 are libraries that are coded to depend only on the LOS 260 or WANOS 262 and the native general purpose computer execution (e.g., compiled C libraries). They are used primarily to supplement the native functionality provided by the SLEE 242.

SLEE libraries 266 are libraries coded to execute in the SLEE 242. They can access the functions provided by the SLEE 242 and the Native Libraries 264. The managed objects 244 are the software loaded and executed by the SLEE 242. They can access the functionality provided by the SLEE 242 and the SLEE libraries 266 (and possibly the native libraries 264).

The ICP-NMS Agent 240 provides the NMS 212 the ability to control the operation of the ICP 172. The ICP-NMS Agent 240 implements the ability to control the operation and configuration of the LOS 260, the operation and configuration of the WANOS 262, and the instantiation and operation of SLEE(s) 242. The proposed service processing architecture operates in layers of increasing abstraction. From the perspective of the SLEE 242, however, there are only two layers: the managed object layer 244, which is the layer of objects (software instances) that are interaction under the control of the NMS 212; and the Library layer 264 or 266, which is the layer of software (either native to the SLEE 242 or the LOS 260) that supplies supplementary functions to the operation of the managed objects 242 or the SLEE 242 itself. It is, however, anticipated that at some point, the NMS 212 may relinquish control of the exact location of managed object instances. For example, managed object instances may be allowed to migrate from one node to another based on one or more algorithms or events, such as in response to demand.

Figure 8:
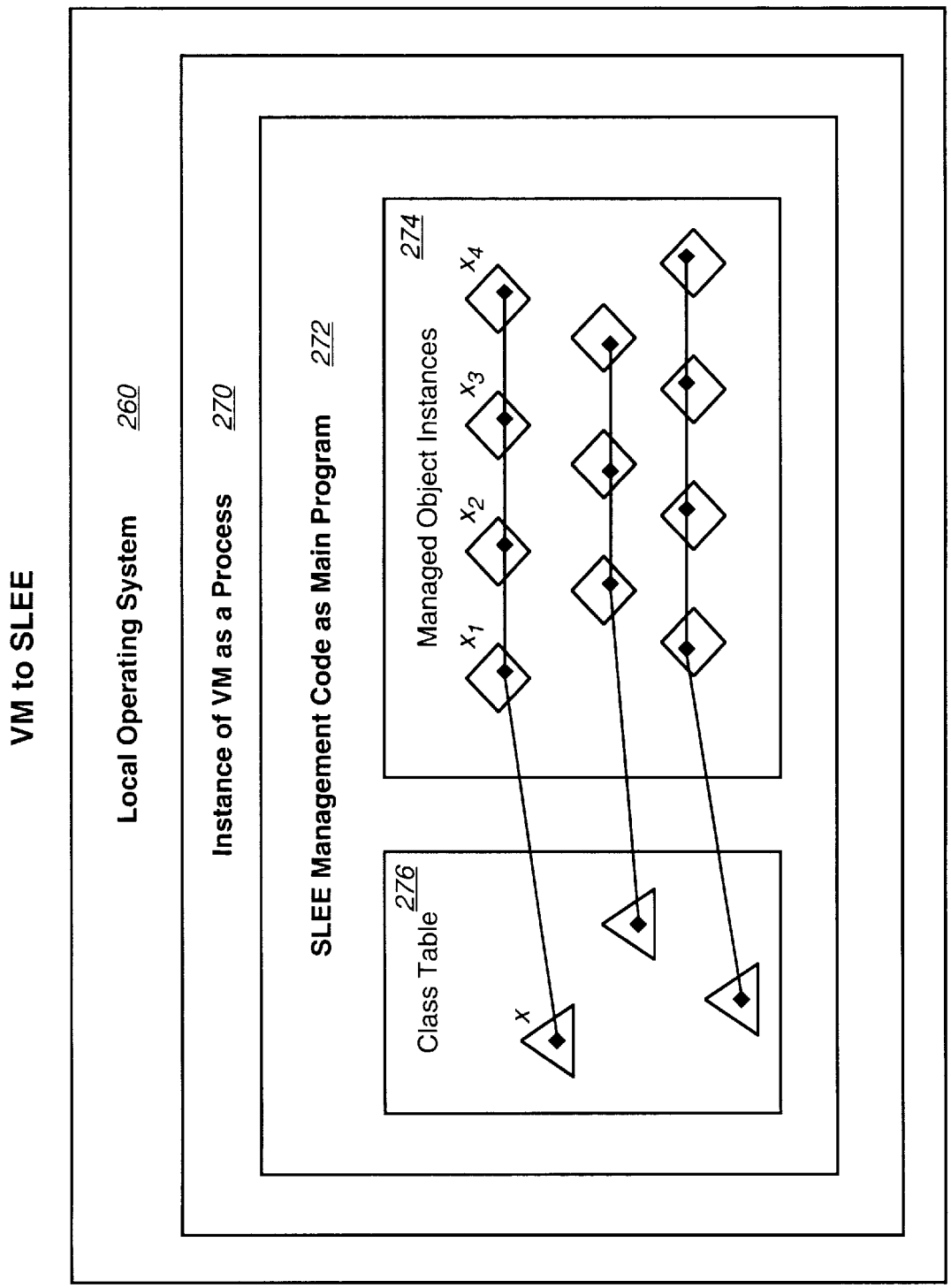
FIG. 8 is a Venn diagram illustrating the nesting of processing contexts whereby a virtual machine supports a service logic execution environment in accordance with the present invention.

FIG. 8 shows the nesting of processing contexts within an ICP 172 such that the SLEE 242 is implemented within a virtual machine 270. A virtual machine 270 is started as a process within a LOS 260 in an ICP 172. Then, the SLEE management code is loaded and executed as the main program 272 by the VM process 270. The SLEE management code executing as the main program 272 interfaces to the ICP-NMS Agent 240 functionality and oversees the creation and destruction of managed object instances 274 from the class table 276. For example, managed object X, which resides in the class table 276 may have multiple instances will be explained, each managed object X is are thereafter instantiated as needed $X_1$, $X_2$, and $X_3$, either under NMS control or during the course of processing services requested by subscribers. The use of a Virtual Machine 270 carries implications for service creation as well as service logic execution.

The IN and AIN architectures revolve around services being encoded as state tables. Such state table descriptions are interpreted by a hard-coded state machine engine which carries out the encoded service function. As a result, the MOCE 228 and Service Logic Interpreter ("SLI") are very interdependent and provide only a fixed palette of functions. If a desired new service requires adding a new building block function, both the MOCE 228 and SLI must be changed, recompiled, throughly tested, and deployed in a coordinated fashion. In an IN or AIN architecture, deployment of new SLI code requires a brief downtime within the network. In contrast, the present invention provides a multiple concurrent architecture that allows new and old SLI's to coexist.

The present invention uses a virtual machine 270 to overcome these disadvantages. A virtual machine 270 is the functional equivalent of a computer, programable at such an elementary level of function (i.e., logic operators, variables, conditional jumps, etc.) that a hosted program can essentially express any conceivable logic function, even those that are not readily expressed as a finite-state model. The universality of a virtual machine 270 is especially useful in this application for allowing expression of call processing logic in forms that may be preferred over a state table. This differs from a logic interpreter, which typically supports higher level functions and is constrained in program semantics and in flexibility of expression. In the IN and AIN architectures, the SLI supports a limited structure and limited set of functions.

When virtual machine 270 software is run upon a general purpose computer, the virtual machine 270 may be viewed as an adapter layer. The code that runs as a program within the virtual machine 270 may have the same granularity of control and access to input/output and storage as if it were running directly upon the processor, yet the very same program may be portable to a totally different processor hardware running an equivalent virtual machine environment (i.e. operational in heterogeneous environments).

In a preferred embodiment, the "Java" platform developed by Sun Microsystems is prescribed for expressing all telephony application software. The prevalence of Java lends practical advantages in platform portability, ubiquity of development tools and skill sets, and existing support protocols such as ftp and http. Java accommodates object-oriented programming in a similar fashion to C++. The SLEE Management Code 272 and all managed objects 276 indicated in the SLEE 242 are encoded as Java bytecodes. The SLEE Management Code 272 includes functions to install, remove, and instantiate classes, to query and delete instances, and to assert global values and run/stop status.

Despite the foregoing advantages, the use of a virtual machine as a SLEE 242, in particular, a Java virtual machine, appears to have been overlooked by IN and AIN architects. Perhaps biased by the more common telephony applications like interactive voice response, IN and AIN designers have thought that a fixed palette of functions is adequate and preferable for its apparent simplicity and similarity to traditional call processing models. Whereas the AIN approach improves the speed of service creation only within a fixed call model and function set, the present invention can as easily evolve the entire implicit service framework to meet new service demands and new call processing paradigms.

The choice of an object-oriented SLEE 242 provides many key advantages including dependancy management and shared security among co-instantiated objects. The touted advantages of object-oriented programming, such as modularity, polymorphism, and reuse, are realized in the SLEE 242 according to the present invention. Because of managed object inheritance hierarchy, widespread changes in call model, protocol, or some other aspects of call processing may be effected by relatively localized code changes, for example, to a single base class. Another important advantage is that the coded classes from which objects are instantiated within each SLEE 242 can be updated without having to disable or reboot the SLEE 242.

In a preferred embodiment, a set of operational rules can be encoded to permit or restrict the deployment of new class-implementing code to the SLEE 242s or the instantiation of objects therefrom based on physical location or operating conditions. These rules can be encoded in different locations, such as part of the managed object image that the NMS 212 uses for deployment or into the actual object code that is activated by the SLEE 242. In either case, the NMS 212 would have error handling procedures for when instantiations fail. Location restrictions could be any means for characterizing the physical location of the node (e.g., nation, state, city, street address, or global coordinates).

In addition, a method of resolving conflicts between the operational rules within the set can be adopted. For example, if a specific object is to be instantiated at node X, which lies in both Region A and Region B, and the set of operational rules provides that instantiation of the specific object is forbidden in Region A, but is permitted in Region B, a conflict arises as to whether or not the specific object can be instantiated at node X. If, however, a conflict resolution rule simply provides that objects can only be instantiated where permitted, the conflict is resolved and the specific object is not instantiated at node X. This set of operational rules could be used to restrict the deployment or instantiation of a Trunk management class code to situations where the intelligent call processor is actually managing trunk resources. These rules could also be used to restrict billing processor instances, which are tailored to the billing regulations of a specific state, to the boundaries of that state. As previously mentioned, these location restriction rules can be internal or external to the class object.

Figure 9:
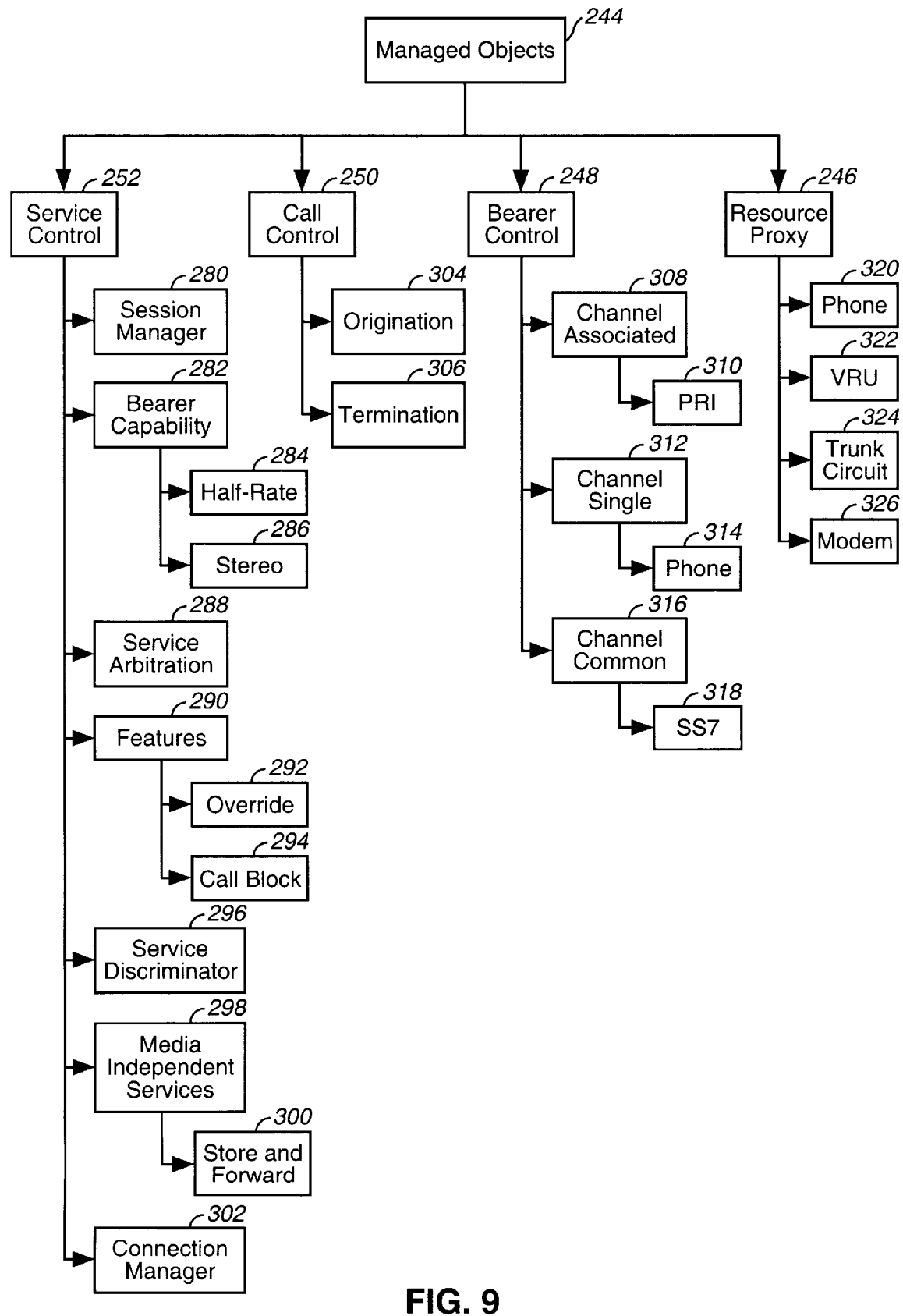
FIG. 9 is a diagram illustrating the class hierarchy of managed objects within an intelligent call processor in accordance with the present invention.

Referring now to FIG. 9, the class hierarchy of managed objects in accordance with a preferred embodiment of the present invention will be described. The abstract base class managed objects 244 includes common functionality and virtual functions to assure that all derived classes can properly be supported as objects in the SLEE 242. Specifically, four distinct subclasses are shown, the service control class 252, call control class 250, bearer control class 248, and resource proxy class 246.

The service control class 252 is the base class for all service function objects. The session manager class 280 encapsulates the session-related information and activities. A session may comprise one or more calls or other invocations of network functions. The session manager class 280 provides a unique identifier for each session. If call processing is taking place in a nodal fashion, then billing information must be collated. A unique identifier for each call makes collation easy, instead of requiring costly correlation processing. In service processing, protocols are wrapped by successive layers of abstraction. Eventually, the protocol is sufficiently abstracted to warrant the allocation/instantiation of a session manager (e.g., in SS7, the receipt of an IAM message would warrant having session management).

The bearer capability class 282 changes the quality of service on a bearer. A service control class 252 can enable changes in the Quality-of-Service ("QoS") of a call or even change the bearer capability, such as moving from 56 Kbit/s to higher rates and then back down. The QoS is managed by the connection manager class 302. For example, a Half-Rate subclass 284 degrades the QoS of a call to 4 Khz sample rate, instead of the usual 8 Khz sample rate. A Stereo subclass 286 might allow a user to form two connections in a call to support left channel and right channel.

The service arbitration class 288 codifies the mediation of service conflicts and service interactions. This is required because service control classes 252 can conflict, particularly origination and termination services. For many practical reasons, it is undesirable to encode within each service control class 252 an awareness of how to resolve conflict with each other type of service control class 252. Instead, when a conflict is identified, references to the conflicting services and their pending requests are passed to the service arbitration class 288. The service arbitration class 288 may then decide the appropriate course of action, perhaps taking in to account local context, configuration data, and subsequent queries to the conflicting service objects. Having a service arbitration class 288 allows explicit documentation and encoding of conflict resolution algorithms, as opposed to either hard-coded or implicit mechanisms. Moreover, when a service is updated or added, the existing services do not have to be updated to account for any conflict changes, which could require the change of multiple relationships within a single service.

The feature class 290 implements the standard set of capabilities associated with telephony (e.g., 3-way calling, call waiting). One such capability can be an override 292 to enable an origination to disconnect an existing call in order to reach an intended recipient. Another common capability can include a call block 294 whereby an origination offer can be rejected based upon a set of criteria about the origination.

The service discrimination class 296 is used to selectively invoke other services during call processing and is subclassed as a service itself. The service discrimination class 296 provides for flexible, context-sensitive service activation and obviates the need to have fixed code within each service object for determining when to activate the service. The activation sequence is isolated from the service itself. For example, Subscriber A and Subscriber B have access to the same set of features. Subscriber A chooses to selectively invoke one or more of his services using a particular set of signals. Subscriber B prefers to use a different set of signals to activate his services. The only difference between the subscribers is the manner in which they activate their services. So it is desirable to partition the selection process from the service itself. There are two available solutions. The service selection process for Subscribers A and B can be encoded in separate service discrimination class 296, or one service discrimination class 296 can use a profile per subscriber to indicate the appropriate information. This can be generalized to apply to more users whose service sets are disjointed. Furthermore, the use of a service discrimination class 296 can alter the mapping of access to services based upon the context or progress of a given call. The implementation of this class allows various call participants to activate different services using perhaps different activation inputs. In the prior art, all switch vendors delivered inflexible service selection schemes, which prevented this capability.

The media independent service class 298 is a type of service control class 252, such as store-and-forward 300, broadcasting, redirection, preemption, QoS, and multi-party connections, that applies to different media types including voice, fax, e-mail, and others. If a service control class 252 is developed that can be applied to each media type, then the service control class 252 can be broken into re-usable service control classes 252. If the service control class 252 is broken into media-dependant functions and a media-independent function (i.e., a media-independent SC which implements a service and a set media-dependant wrapper SC's—one per media type). As derived from the media-independent class 298, store and forward 300 provides the generic ability to store a message or data stream of some media type and then the ability to deliver it later based on some event. Redirection provides the ability to move a connection from one logical address to another based on specified conditions. This concept is the basis for call forwarding (all types), ACD/UCD, WATS (1–800 services), find-me/follow-me and mobile roaming, etc. Preemption, either negotiated or otherwise, includes services such as call waiting, priority preemption, etc. QoS modulated connections implement future services over packet networks, such as voice/fax, streaming video and file transfer. Multi-party connections include 3-way and N-way video conferencing, etc. Although user control and input is primarily implemented using the keys on a telephone, voice recognition is expected to be used for user control and input in the future.

The connection manager class 302 is responsible for coordinating and arbitrating the connections of various bearer controls 248 involved in a call. Thus, the complexity of managing the connectivity between parties in multiple calls is encapsulated and removed from all other services. Service and Call processing are decoupled from the connections. This breaks the paradigm of mapping calls to connections as one to many. Now the mapping of calls to calls is many to many.

The connection manager classes 302 within an architecture are designed to operate stand-alone or collaborate as peers. In operation, the service control classes 252 present the connection manager classes 302 with requests to add, modify and remove call segments. It is the connection manager class' 302 responsibility to accomplish these changes. Note: Since connections can be considered either as resources in and of themselves or as the attributes of resources, a connection manager class 302 can be implemented as a proxy or an aspect of basic resource management functions.

The call control class 250 implements essential call processing, such as the basic finite-state machine commonly used for telephony, and specifies how call processing is to take place. Two classes may be derived along the functional partition of origination (placing a call) 304 and termination (accepting a call) 306.

The bearer control class 248 is directed at adapting specific signals and events to and from the Resource Complex 180, via the resource proxy 246, into common signals and events that can be understood by the call control objects 250. One anticipated role of an object derived from this class is to collect information about the origination end of a call, such as subscriber line number, class of service, type of access, etc. Subclasses may be differentiated on the basis of the number of circuits or channels associated with the signaling. These may include a channel associated class 308, as applies to the single signaling channel per 23 bearer channels in an ISDN Primary Interface 310, a channel single class 312 as typified by an analog phone 314 that uses dialing to control a single circuit, and the channel common class 316, represented by SS7 signaling 318 entirely dissociated from bearer channels.

The resource proxy class 246 is devoted to interfacing the execution environment to real-world switches and other elements in the bearer network. Examples of internal states implemented at this level and inherited by all descendent classes are in-service vs. out-of-service and free vs. in use. Contemplated derived classes are phone 320 (a standard proxy for a standard 2500 set), voice responsive units ("VRUs") 322 (a standard proxy for voice response units), IMT trunk connections 324 (a standard proxy for digital trunk (T1/E1) circuits), and modem connections 326 (a standard proxy for digital modems), corresponding to specific types of resources in the Resource Complex 180.

Figure 10:
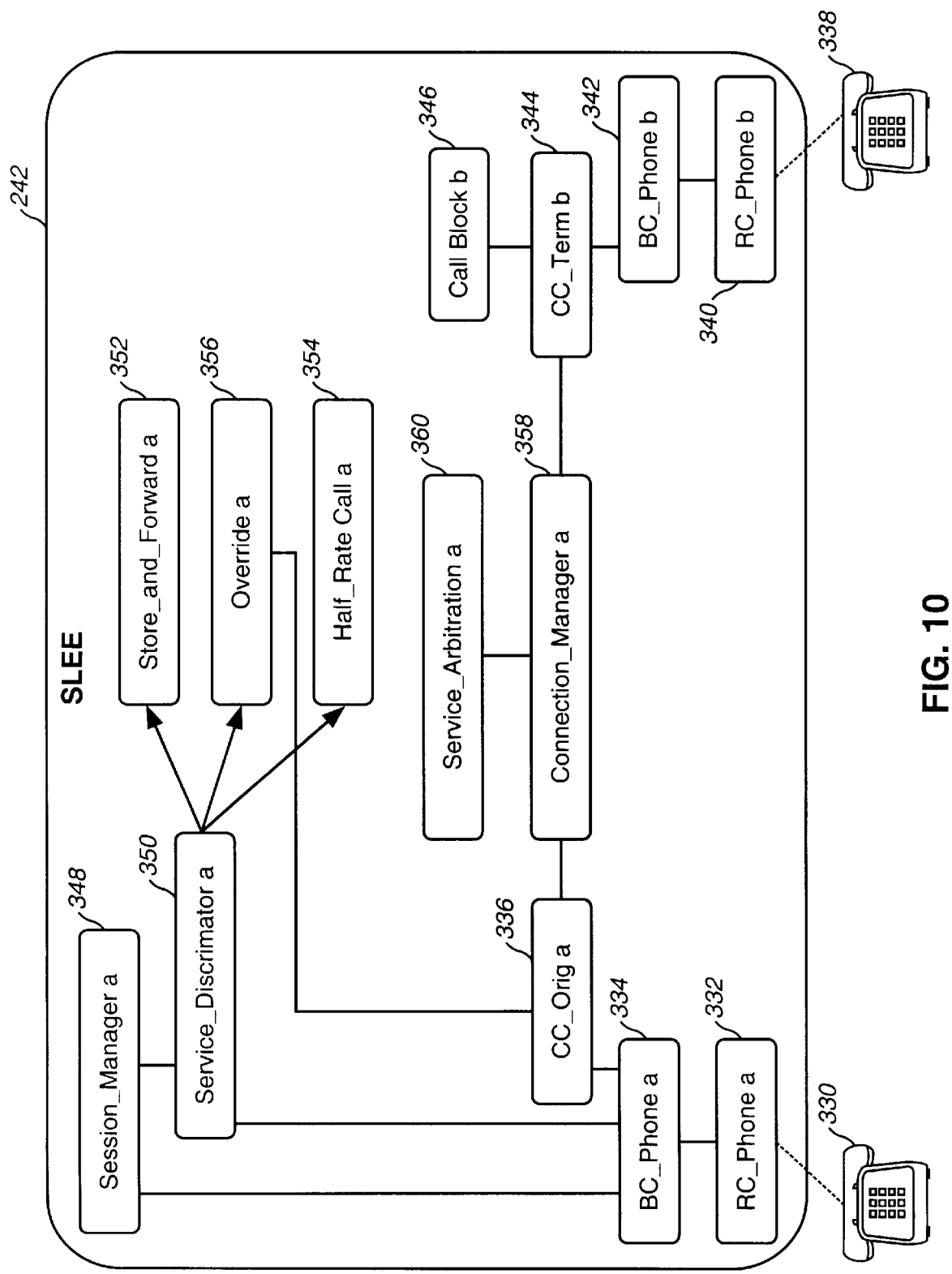
FIG. 10 is a diagram illustrating the interaction of managed objects in an example call processing scenario in accordance with the present invention.

Now referring to FIG. 10, the dynamic logical relationship of some instantiated objects will be shown. A real-world telephone A 330 is coupled to a chain of objects in the SLEE 242 through a Resource Complex Proxy (not shown). The RC_Phone A 332, BC_Phone A 334, and CC_Orig A 336 objects remain instantiated in the SLEE 242 at all times. State change and messaging occurs among these objects whenever the real-world telephone goes on-hook or off-hook or when the keypad is pressed. Likewise, telephone B 338 is represented in the SLEE 242 by a chain of RC_Phone B 340, BC_Phone B 342 and CC_Term B 344 objects. An instance of Call Block B 346 is associated with CC_Term B 344, indicating that subscriber B has previously put a call blocking function into effect for phone B 338.

When Subscriber A goes off-hook, RC_Phone A 332 receives notification and sends it to BC_Phone A 334, which propagates the notification to the Session_Manager A 348 to start a session. The Session_Manager A 348 algorithmically determines the default service control class associated with session start (i.e., it looks up in configuration specified as the default for RC_Phone A 332). The Session_Manager A 348 finds that the Service_Discriminator A 350 is the default service control class and invokes it.

The Service_Discriminator A 350 directs the BC_Phone A 334 to collect enough information to determine the service ultimately being activated (e.g., it prompts Subscriber A to dial the service code and/or destination digits). In this example, the Service Discriminator A 350 determines whether subscriber A intends to activate a Store_and_Forward service 352 (e.g., a voice-mail feature) or a Half-Rate call 354 (a service that adjusts bearer capability; it reduces the bandwidth by half) or Override 356 (a service that forces a terminator to accept an origination).

Subscriber A dials the digits to indicate the activation of Override to Phone B 338. The Service Discriminator 350 activates the Override feature 356. The Override service control 356 collects enough information to determine where Subscriber A wants to call. The Override service control 356 invokes the originating call control (CC_Orig A 336) to offer the call via the Connection_Manager A 358. The Connection_Manager A 358 contacts the terminating call control, CC_Term B 344, which contacts the Call_Block service B 346 that has been activated on it. The Call Block service 346 notifies the Connection_Manager A 358 through the CC_Term B 344 that the call has been rejected. CC_Orig A 336 has instructed the Connection Manager A 358 not to accept a rejection due to the Override service control 356. The Override 356 and Call_Block 346 services are now in conflict.

The Connection_Manager 358 invokes the Service Arbitration Service 360 citing the conflict. The Service Arbitration Service 360 based on the information presented it algorithmically determines a winner (e.g., the terminating call control must accept the call). CC_Term B 344 accepts the origination attempt and it propagates the appropriate signaling to the BC_Phone B 342 and RC_Phone B 340. Phone B 338 starts ringing and Subscriber B answers. The resulting answer event is passed up through the CC_Term B 344 all the way to the CC_Orig A 336. At this point, the Connection Manager A 358 sets up the speech path and Subscriber A and B are talking. The call is now in a stable state. The Service Manager A 348 records the successful completion of the call. Now, both call controls 336 and 344 are waiting for a terminating signal which will end the call. Subscriber B hangs up. The message is propagated to both call controls 336 and 344. The call controls 336 and 344 end their participation in the call. The Connection Manager A 358 tears down the connection and the Session Manager 348 records the termination of the call. Subscriber A hangs up and the Service Manager 348 passes the record of the call to the billing system. As those skilled in the art will know, tradeoffs can be made as to value of the flexibility instantiating objects on demand versus performance gains of instantiating and managing the instances prior to when they are needed.

Figure 11:
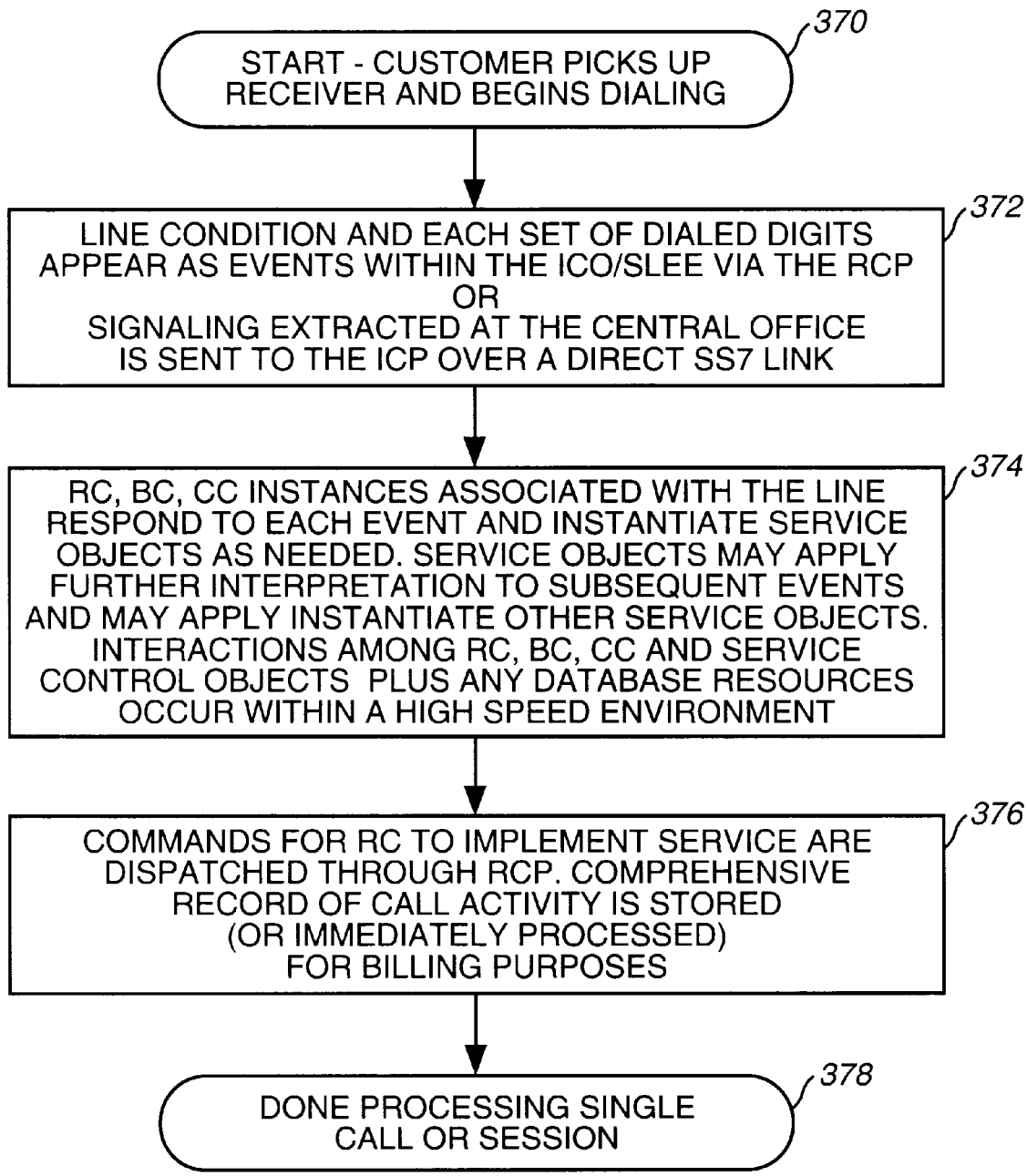
FIG. 11 is a flowchart for generic call processing in accordance with the present invention.

FIG. 11 is a flowchart of process steps form generic call processing in accordance with the present invention, wherein interactions take place in a high speed environment and call processing intelligence may be applied from the outset of a given call. The customer picks up the receiver an begins dialing in block 370. The line condition and each set of dialed digits appear as incremental events within the ICP/SLEE via the RCP or alternatively as signaling sent directly from the central office to the ICP over a direct SS7 link in block 372. Resource control, bearer control, and call control instances associated with the line respond to each event and instantiate service objects as needed in block 374. The service objects may apply further interpretation to subsequent events and may instantiate other service objects. Interactions among resource control, bearer control, call control and service control objects plus any database resources occur within a high speed environment. Commands for resource control to implement service are dispatched through RCP and a comprehensive record of call activity is stored or immediately processed for billing purposes in block 376. Single call or session processing is completed in block 378.

Figure 12:
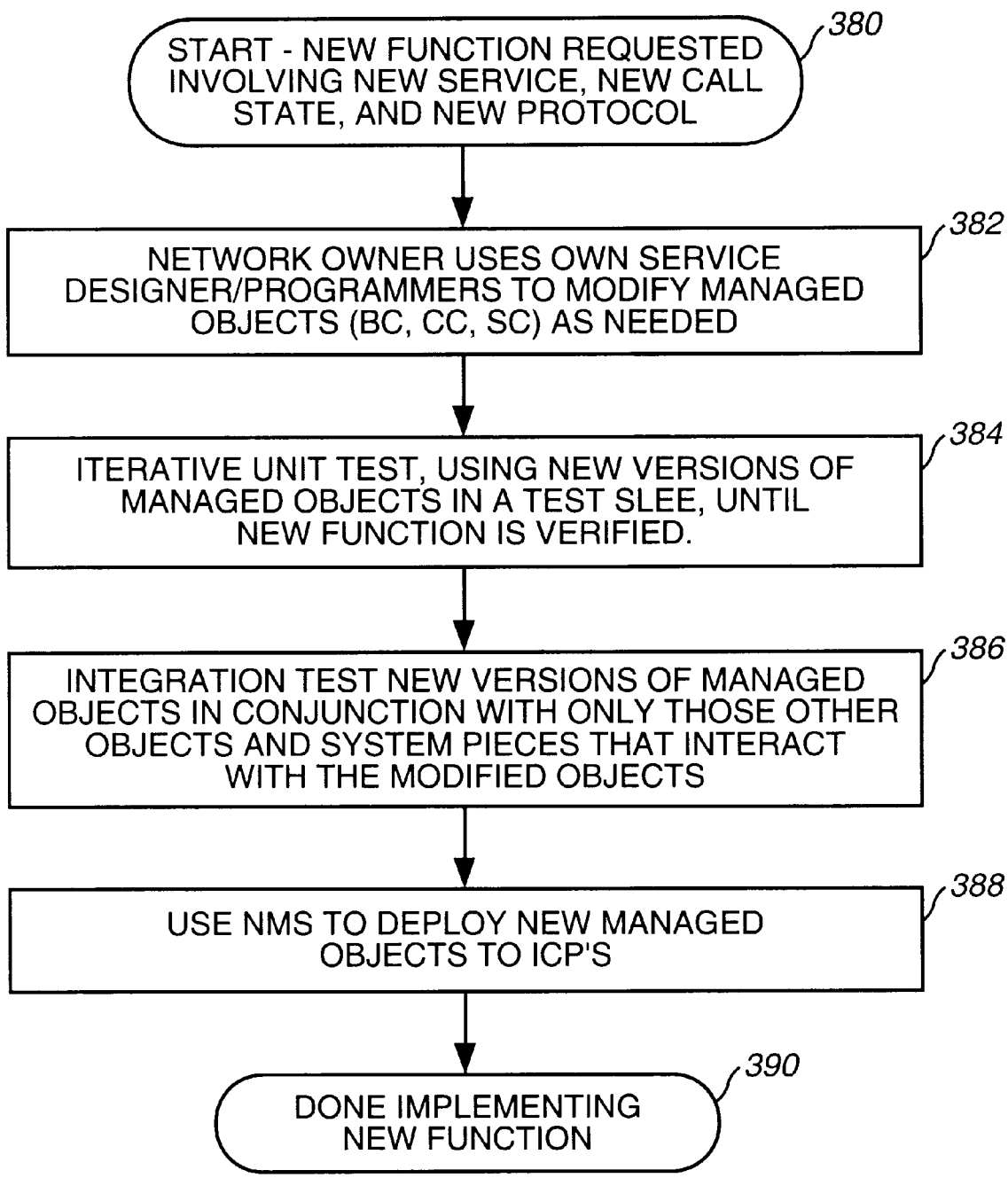
FIG. 12 is a flowchart for generic service creation using managed objects in accordance with the present invention.

FIG. 12 illustrates the process steps for generic service creation using managed objects in accordance with the present invention. Service creation using managed objects is completely within the network owner's control, is considerably faster, and is performed within a unified environment using a consistent set of tools. A new function is requested involving a new service, new call state and new protocol in block 380. The network owner uses own service designers or programmers to modify managed objects (bearer control, call control and service control) as needed in block 382. Iterative unit testing using new versions of managed objects in a test SLEE until the new function is verified in block 384. Integration testing of new versions of managed objects in conjunction with only those other objects and system pieces that interact with the modified objects in block 386. The NMS is used to deploy the new managed objects to the ICP's in block 388. Implementation of the new function is completed in block 390.

Figure 13:
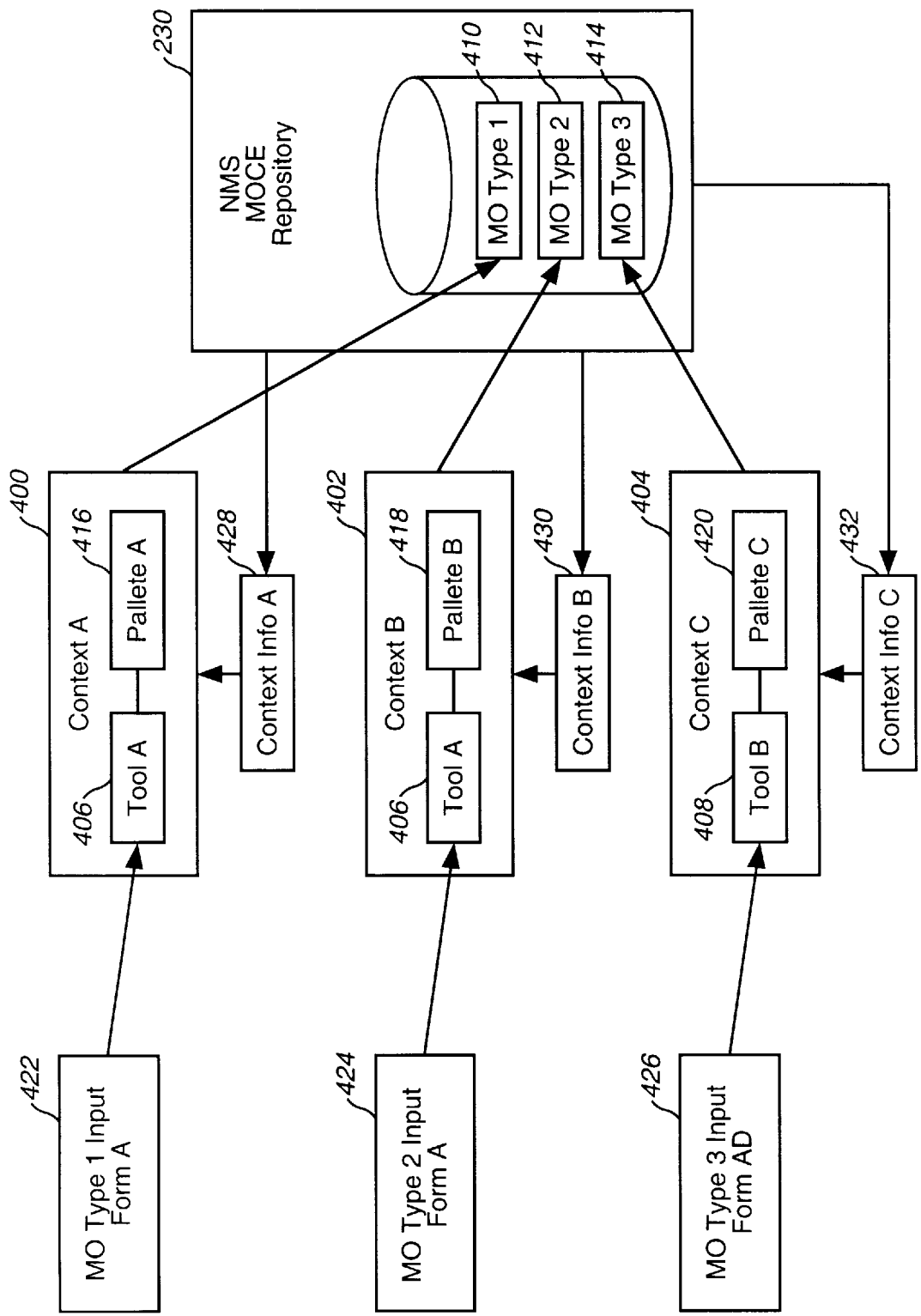
FIG. 13 illustrates the use of similar tools during service creation to create compatible objects for the same target environment in accordance with the present invention.

FIG. 13 illustrates the use of similar tools during service creation to create compatible objects for the same target environment in accordance with the present invention. In the MOCE 228, developers of different types of functionality (Context A 400, Context B 402 and Context C 404) use similar tools (Tool A 406 and Tool B 408) to create compatible objects (MO Type 1 410, MO Type 2 412 and MO Type 3 414) for the same target environment. The palette (Palette A 416, Palette B 418 and Palette C 420) for each tool (Tool A 406 and Tool B 408) is appropriately different for the type of development. Each managed object (MO Type 1 410, MO Type 2 412 and MO Type 3 414) is created by combining input data (MO Type 1 Input Form A 422, MO Type 2 Input Form A 424, and MO Type 3 Input Form AD 426) and context information (Context info A 428, Context info B 430, Context info C 432) using the tools (Tool A 406 and Tool B 408) and palettes (Palette A 416, Palette B 418 and Palette C 420). The managed objects (MO Type 1 410, MO Type 2 412 and MO Type 3 414) are then stored in the Repository 230.

Figure 14:
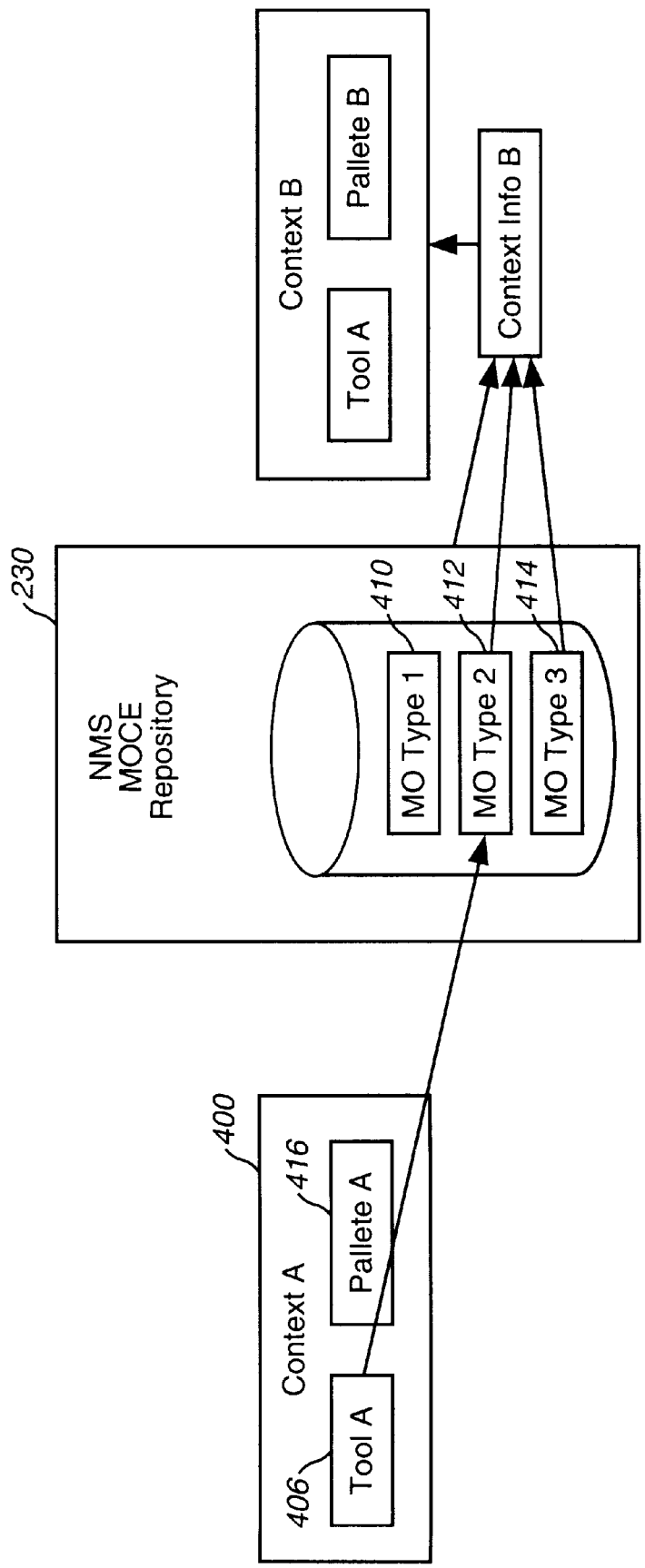
FIG. 14 illustrates how the palette for each tool may change in response to new functional pieces in accordance with the present invention.

FIG. 14 illustrates how the palette for each tool may change in response to new functional pieces in accordance with the present invention. The palette for each tool may change in response to new functional pieces introduced by other developers.

Figure 15:
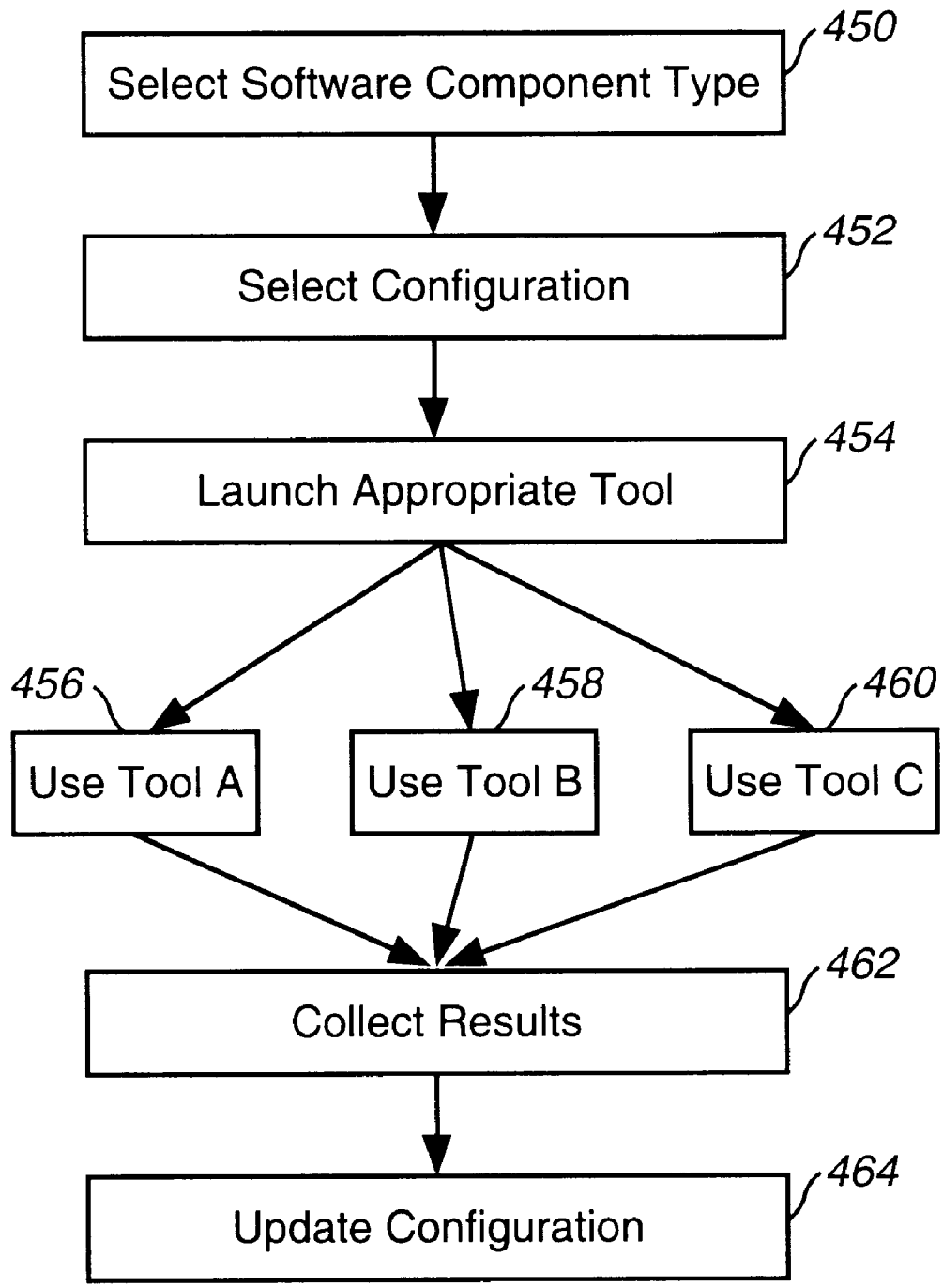
FIG. 15 illustrates the Managed Object Creation Environment use flow.

FIG. 15 illustrates the Managed Object Creation Environment use flow. The software component type is selected in block 450 and the configuration is selected in block 452 and the appropriate tool is launched in block 454. The user may select tool A 456, tool B 458 or tool C 460. Next the results are collected in block 462 and the configuration is updated in block 464.

Figure 16:
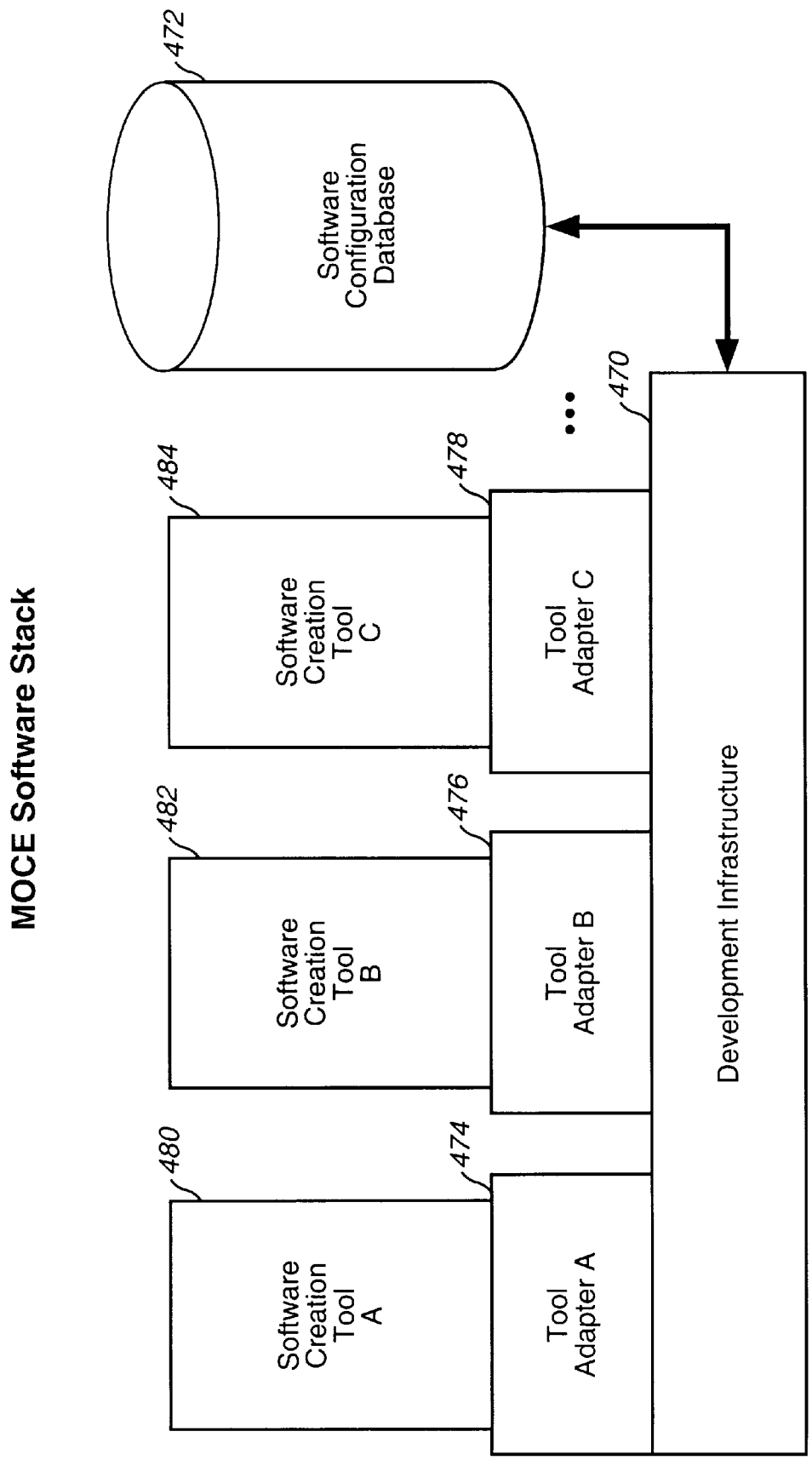
FIG. 16 illustrates the Managed Object Creation Environment Stack.

FIG. 16 illustrates the Managed Object Creation Environment Software Stack. The base of the Managed Object Creation Environment Software Stack is the development infrastructure 470. The development infrastructure 470 interfaces with the software configuration database 472 to read and store information relevant to creating managed objects. The user creates managed objects using software creation tools A 480, B 482 and C 484 that in turn utilize tool adapters A 474, B 476 and C 478 to interface with the development infrastructure 470.

Figure 17:
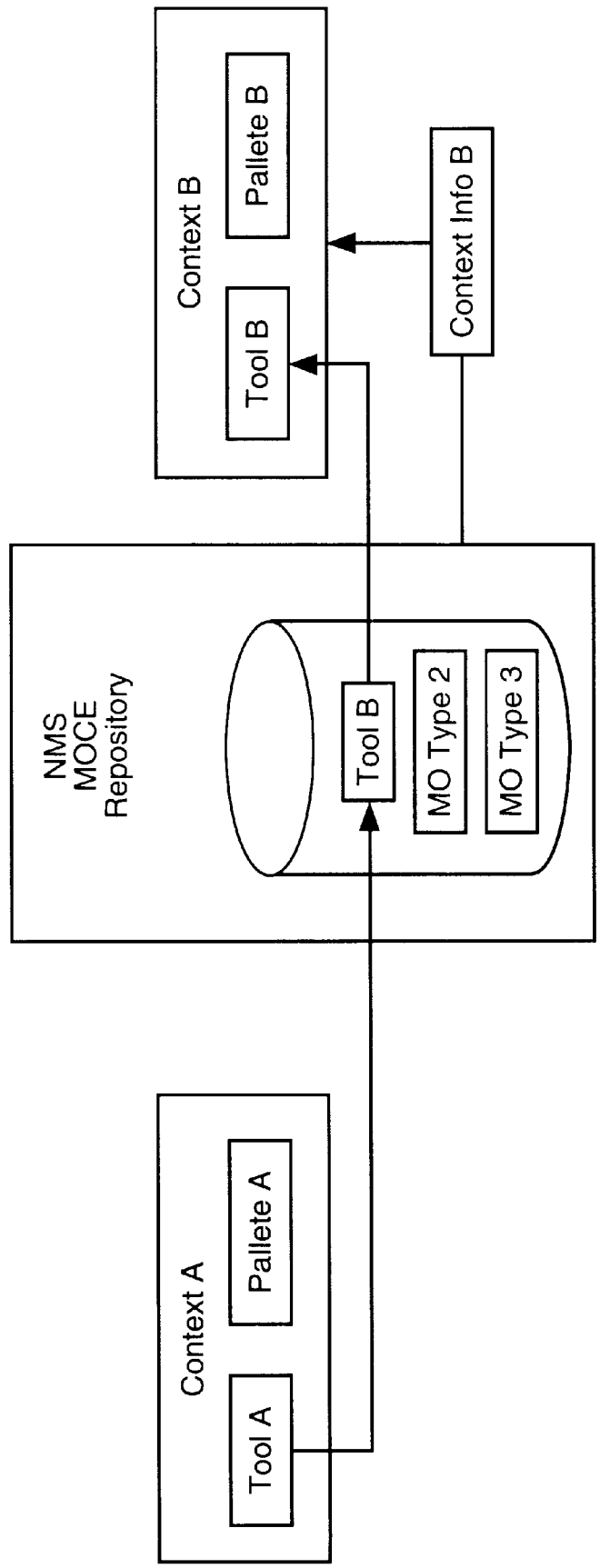
FIG. 17 illustrates how the unified execution environment also allows for simplified creation and modification of even the tools by which developers author objects for the SLEE.

FIG. 17 illustrates how the unified execution environment also allows for simplified creation and modification of even the tools by which developers author objects for the SLEE.

A few preferred embodiments have been described in detail hereinabove. It is to be understood that the scope of the invention also comprehends embodiments different from those described, yet within the scope of the claims.

For example, the general purpose computer is understood to be a computing device that is not made specifically for one type of application. The general purpose computer can be any computing device of any size that can perform the functions required to implement the invention.

In additional example is the "Java" programming language can be replace with other equivalent programming languages that have similar characteristics and will perform similar functions as required to implement the invention.

The usage herein of these terms, as well as the other terms, is not meant to limit the invention to these terms alone. The terms used can be interchanged with others that are synonymous and/or refer to equivalent things. Words of inclusion are to be interpreted as nonexhaustive in considering the scope of the invention. It should also be understood that various embodiments of the invention can employ or be embodied in hardware, software or microcoded firmware.

While the present invention has been disclosed and discussed in connection with the above-described embodiment, it will be apparent to those skilled in the art that numerous changes, variations and modifications within the spirit and scope of the invention are possible. Accordingly, it is therefore intended that the following claims shall encompass such variations and modifications.

What is claimed is:

1. A method of using a Managed Object Creation Environment to update a software configuration comprising the steps of:

selecting a software component type;

selecting a software configuration;

launching an appropriate software creation tool;

using the appropriate software creation tool to modify or create one or more managed objects within the software configuration;

collecting one or more results from the appropriate software creation tool and;

updating the selected software configuration based on the one or more results.

2. A method of using one or more managed objects to provide a service comprising the steps of:

receiving an event within a service layer execution environment;

determining the one or more managed objects needed to respond to the event;

instantiating the one or more managed objects; and providing the service using the one or more instantiated managed objects.

3. A method of implementing a new service using one or more managed objects comprising the steps of:

creating the one or more managed objects;

testing the one or more managed objects in a test service layer execution environment;

whenever the testing of the one or more managed objects is successful, performing integration tests by testing the one or more managed objects with other managed objects and systems needed to implement the new service; and whenever the integration testing is successful, implementing the new service by deploying the one or more managed objects to one or more intelligent call processors.

* * * * *